US011421169B2

(12) United States Patent
Goodrich et al.

(10) Patent No.: US 11,421,169 B2
(45) Date of Patent: Aug. 23, 2022

(54) BENEFICIATION OF COAL FOR STORAGE, TRANSPORTATION, AND GASIFICATION

(71) Applicant: TerraPower, LLC, Bellevue, WA (US)

(72) Inventors: Benjamin L. Goodrich, Marysville, WA (US); Pyoungchung Kim, Bothell, WA (US); Evan Terrell, Pullman, WA (US); Joshua C. Walter, Kirkland, WA (US)

(73) Assignee: TerraPower, LLC, Belleview, WA (US)

( * ) Notice: Subject to any disclaimer, the term of this patent is extended or adjusted under 35 U.S.C. 154(b) by 216 days.

(21) Appl. No.: 16/684,875

(22) Filed: Nov. 15, 2019

(65) Prior Publication Data

US 2020/0157447 A1    May 21, 2020

Related U.S. Application Data

(60) Provisional application No. 62/768,630, filed on Nov. 16, 2018.

(51) Int. Cl.
*C10L 5/08* (2006.01)
*C10B 53/04* (2006.01)
(Continued)

(52) U.S. Cl.
CPC ............... *C10L 5/08* (2013.01); *C10B 53/04* (2013.01); *C10B 57/10* (2013.01); *C10L 5/363* (2013.01);
(Continued)

(58) Field of Classification Search
CPC ............. C10L 2270/10; C10L 2290/02; C10L 2290/04; C10L 2290/06; C10L 2290/08;
(Continued)

(56) References Cited

U.S. PATENT DOCUMENTS

| 4,211,632 A | 7/1980 | Chukhanov et al. |
| 4,412,840 A | 11/1983 | Goskel |
| 2018/0291275 A1 | 10/2018 | Goodrich |

FOREIGN PATENT DOCUMENTS

| CN | 102144137 B | * | 7/2015 | ................ C10L 5/26 |
| WO | 1991/007478 A1 | | 5/1991 | |
| WO | 2008/091163 A1 | | 7/2008 | |

OTHER PUBLICATIONS

PCT International Search Report and Written Opinion in International Application PCT/US2019/061819, dated Feb. 28, 2020, 18 pages.

(Continued)

*Primary Examiner* — Latosha Hines
(74) *Attorney, Agent, or Firm* — Merchant and Gould, P.C.

(57) ABSTRACT

This document describes methods for pretreating coal to create either a dried coal or a char product that is stable in the outdoor environment and is more efficient as a feedstock for gasification or other processes than the original coal. Embodiments of the methods include pulverizing and pelletizing the coal, and pretreating the coal pellets to obtain a stable pellet of either dried coal or a stable pellet of chared coal (coal char). The pellets created by the described methods have undergone deoxygenation and carbonization improving their handling and storage properties and, in some cases, energy density. Pore structures within the pellets are stabilized physically and chemically so that the uptake of moisture into dry coal, that leads to internal heat generation, is greatly reduced. Chars are also, therefore, stable against transitions from a dry state to a wet state and less prone to self-ignition.

21 Claims, 17 Drawing Sheets

(51) Int. Cl.
*C10B 57/10* (2006.01)
*C10L 5/36* (2006.01)

(52) U.S. Cl.
CPC ....... *C10L 2270/10* (2013.01); *C10L 2290/02* (2013.01); *C10L 2290/08* (2013.01); *C10L 2290/28* (2013.01); *C10L 2290/58* (2013.01)

(58) Field of Classification Search
CPC ........... C10L 2290/28; C10L 2290/544; C10L 2290/58; C10L 2290/60; C10L 5/04; C10L 5/08; C10L 5/28; C10L 5/363; C10L 9/00; C10L 9/08; C10L 5/10; C10B 53/04; C10B 57/10
See application file for complete search history.

(56) References Cited

OTHER PUBLICATIONS

Iwai, Y. et al., "Physical properties of low rank coals dried with supercritical carbon dioxide", the Journal of Supercritical Fluids, Elsevier, Amsterdam, NL, vol. 18, No. 1, Aug. 10, 2000, pp. 73-79.
Perera, M.S.A. et al., "Effects of gaseous and super critical carbon dioxide saturation on the mechanical properties of bituminous coal from the southern Sydney basin", Applied Energy, Elsevier Science Publishes, GB, vol. 110, May 9, 2013, pp. 73-81.
Ranathunga, A.S. et al., "Influence of $CO_2$ adsorption on the strength and elastic modulus of low rank Australian coal under confining pressure", International Journal of Coal Geology, Elsevier, Amsterdam, NL, vol. 23, No. 3, Mar. 1, 2002, pp. 251-255.
Iwai, Y. et al., "Low temperature drying of low rank coal by supercritical carbon dioxide with methanol as entrainer", The Journal of Supercritical Fluids, Elsevier, Amsterdam, NL, vol. 23, No. 3, Aug. 1, 2002, pp. 251-255.
Westerhof, Roel J.M. et al., Effect of Temperature in Fluidized Bed Fast Pyrolysis of Biomass: Oil Quality Assessment in Test Units, Industrial & Engineering Chemistry Research, vol. 49, Issue 3, (2010), pp. 1160-1168.
Demirbas, Ayhan et al., "An Overview of Biomass Pyrolysis", Energy Sources, vol. 24, Ussye 3, (2002), pp. 171 482.
Botero, Cristina et al., "The Phase Inversion-based Coal-CO2 Slurry (PHICCOS) feeding system: Technoeconomic assessment using coupled multiscale analysis", International Journal of Greenhouse Gas Control 18 (2013), pp. 150-164.
PCT/US2019/061819 IPRP dated May 18, 2021, 8 pages.

* cited by examiner

| TEST # | | RUN 42/43 | RUN 44 | RUN 45 | RUN 46 | RUN 47 | RUN 48 |
|---|---|---|---|---|---|---|---|
| SAMPLE INFORMATION | SAMPLE TYPE | | | SBA | | | |
| | PARTICLE SIZE (mm) | 5.6-12.5 | 2.0-5.6 | 2.0-5.6 | 2.0-5.6 | 4.5.6 | 5.6-8 |
| | SAMPLE LOADED (g) | 2000 | 1028 | 1000 | 980 | 1000 | 931 |
| | MOISTURE (%) | 1.4 | 31 | 30.5 | 10 | 10 | 1 |
| OPERATION PARAMETER | TEST TEMPERATURE (°C) | 450 | 450 | 450 | 450 | 450 | 450 |
| | TEST PRESSURE (MPa) | 9.5 | 9.5 | 9.5 | 9.5 | 9.5 | 9.5 |
| | CO2 MASS FLOW RATE (kg/min) | 7.5 | 7.5 | 6.6 | 6.6 | 6.2 | 6.2 |
| | PYROLYSIS DURATION (min) | 20 | 20 | 20 | 20 | 20 | 20 |
| YIELD (%) | CHAR (%) | 72.0% | 60.0% | 61.6% | 71.1% | 63.1% | 69.4% |
| | TOTAL LIQUID (%) | 8.6% | 30.1% | 29.8 | 12.3 | 27.4 | 20.8 |

FIG.6A

| | RUN 49 | RUN 50 | RUN 52 | RUN 53 | RUN 54 |
|---|---|---|---|---|---|
| SBB | 8-12 | 5.6-8 | 5.6-8 | 5.6-8 | 5.6-8 |
| | 936.6 | 984.5 | 1000 | 923.1 | 1000.1 |
| | 4 | 4 | 4 | 4 | 4 |
| | 450 | 450 | 450 | 450 | 450 |
| | 9.5 | 9.5 | 9.5 | 9.5 | 9.5 |
| | 6.2 | 6.2 | 6.2 | 6.2 | 6.2 |
| | 20 | 20 | 20 | 20 | 20 |
| | | 78.8 | 80.2 | 76.3 | 74.2 |
| | 6.1 | 6.5 | 9.7 | 16.2 | 29.9 |

FIG.6A
CONTINUED

| TEST # | | RUN 55 | RUN 56 | RUN 57 |
|---|---|---|---|---|
| SAMPLE INFORMATION | SAMPLE TYPE | LA | LA | SBA+SBD (9:1 BY WT) |
| | PARTICLE SIZE (mm) | 5.6-8.0 | 5.6-12.5 | 2.0-5.6 |
| | SAMPLE LOADED (g) | 1000.67 | 918 | 1005 (900+105) |
| | MOISTURE(%) WET BASIS | 34 | 43 | 8.5 |
| | DRIED SAMPLE (g) | 660 | 523.3 | 919.6 |
| OPERATION PARAMETER | TEST TEMPERATURE (°C) | 450 | 450 | 475 |
| | TEST PRESSURE (MPa) | 9.0 | 9.5 | 9.9.5 |
| | CO2 MASS FLOW RATE (kg/min) | 6.5 | 7.5 | 3.5-4.5 |
| | PYROLYSIS DURATION (min) | 15 | 20 | 25 |
| YIELD(%) | CHAR YIELD (g) WET BASIS | 593.2g (59.2%) | 377.8g (41.1%) | 868.8g (86.5%) |
| | YIELD (%) DRY BASIS | 89.9% | 72.2% | 72.6% |
| | YIELD (OIL+WATER)%* | 302.2g (30.2%) | 379.2g (41.8%) | 200.3g (19.9%) |
| | OIL YIELD (OIL) %** | 21g(4.5%) | 17.1g(4.7%) | 64.2g(7.5%) |

FIG.6B

| | RUN 58-59 | RUN 60-61 | RUN 62-63 | RUN 64-65 | RUN 66-67 |
|---|---|---|---|---|---|
| | LA | LB | LC | SBC | LB |
| | PELLET | PELLET | PELLET | PELLET | PELLET |
| | 1000.8+1000.2 | 938.2+923.3 | 1004+998.1 | 845.49+821.3 | 885.8+821.8 |
| | 6.7 | 8.2 | 2.4 | 4.1 | 2.4%+6.4% |
| | 1806.9 | 1717.1 | 1954.0 | 1598.5 | 1623.5 |
| | 475 | 475 | 475 | 475 | 510 |
| | 9.5 | 9.5 | 9.5 | 9.5 | 9.5 |
| | 6.6 | 6.1 | 6.1 | | 6.1 |
| | 20 | 20 | 20 | 20 | 20 |
| | 1457.3g (668.8+717.5) (72.8%) | 1321.9g (655.4+683.3) (77.0%) | 1306.3 (756.7+749.6) 77.1% | 1205.7 (605.9+599.8) 75.4% | 658.1+ |
| | 413.4g (20.7%) | 280.9g (15.0%) | 157g (7.8%) | 228.1 (13.7%) | 305.85g (17.9%) |
| | 214.0g (7.2%) | 120g (8.6%) | 71.2g (4.4%) | 80.9g (5.1%) | 73g (5.5%) |

FIG.6B
CONTINUED

| SAMPLE | | MOISTURE CONTENT (%) | | | VOLATILE MATTER (%) | | |
|---|---|---|---|---|---|---|---|
| | | AVERAGE | ± | STDEV | AVERAGE | ± | STDEV |
| SBA | 2.0-5.8mm | 35.7 | ± | 11.2 | 37.7 | ± | 8.8 |
| RUN 45 CHAR | | 0.1 | ± | 0.1 | 20.5 | ± | 1.9 |
| RUN 47 COAL | 4-5.6mm | 10.6 | ± | 0.1 | 40.8 | ± | 4.4 |
| RUN 47 CHAR | | 0.0 | ± | 0.0 | 24.9 | ± | 0.9 |
| RUN 48 COAL | 5.6-8mm | 0.5 | ± | 0.2 | 42.2 | ± | 0.6 |
| RUN 48 CHAR | | 0.0 | ± | 0.0 | 24.0 | ± | 1.9 |
| SBB | 5.6-8.0mm | 2.6 | ± | 0.8 | 38.1 | ± | 1.3 |
| RUN 50 CHAR | | 0.2 | ± | 0.1 | 21.3 | ± | 0.5 |
| RUN 53 CHAR (FORMIC ACID) | | 0.2 | ± | 0.1 | 21.3 | ± | 0.3 |
| LA | COAL | 12.3 | ± | 0.6 | 36.8 | ± | 1.7 |
| RUN 53 CHAR | | 2.1 | ± | 0.1 | 22.2 | ± | 1.0 |

FIG. 6C

| ASH CONTENT (%) | | | FIXED CARBON (%) | | | BTU/lb |
|---|---|---|---|---|---|---|
| AVERAGE | ± | STDEV | AVERAGE | ± | STDEV | |
| 6.7 | ± | 0.0 | 49.4 | ± | 0.0 | 10729 |
| 17.1 | ± | 6.3 | 63.0 | ± | 4.0 | 10995 |
| 8.2 | ± | 0.5 | 49.6 | ± | 0.1 | 10510 |
| 11.6 | ± | 0.5 | 63.5 | ± | 0.3 | 10553 |
| 8.2 | ± | 0.5 | 49.6 | ± | 0.1 | 10466 |
| 11.1 | ± | 0.2 | 84.9 | ± | 1.7 | 10600 |
| 4.0 | ± | 0.3 | 57.9 | ± | 1.2 | 11602 |
| 4.0 | ± | 0.7 | 74.7 | ± | 0.5 | 12929 |
| 9.0 | ± | 2.6 | 67.7 | ± | 2.3 | 12149 |
| 31.1 | ± | 1.8 | 32.1 | ± | 2.7 | 7484 |
| 39.7 | ± | 0.9 | 38.1 | ± | 0.4 | 7205 |

FIG. 6C
CONTINUED

| SAMPLE | | MOISTURE CONTENT (%) | | | VOLATILE MATTER (%) | | |
|---|---|---|---|---|---|---|---|
| | | AVE | ± | STDEV | AVE | ± | STDEV |
| COAL | | 4.1 | ± | 0.5 | 44.2 | ± | 0.3 |
| SBA | | 3.0 | ± | 0.2 | 38.5 | ± | 0.3 |
| SBB | | 52.0 | ± | 0.9 | 41.0 | ± | 0.5 |
| LB | | 47.9 | ± | 2.4 | 37.2 | ± | 0.4 |
| LC | | 2.5 | ± | 0.0 | 30.5 | ± | 1.1 |
| SBD | | 0.0 | ± | 0.0 | 20.0 | ± | 0.1 |
| SBA+SBD CHAR (RUN 57) | | 11.7 | ± | 0.1 | 36.8 | ± | 0.7 |
| LA | AS RECEIVED | 0 | ± | 0 | 25.3 | ± | 1.7 |
| | RUN 55 CHAR | 0 | ± | 0 | 25.1 | ± | 0.8 |
| | RUN 56 CHAR | 6.0 | ± | 0.1 | 36.2 | ± | 1.1 |
| | LIGNITE PELLET RUN 58+59 PELLET CHAR | 0 | ± | 0 | 18.2 | ± | 0.2 |
| LB | AS RECEIVED | 52.0 | ± | 0.9 | 41.8 | ± | 0.5 |
| | PELLET | 2.4 | ± | 0.1 | 39.8 | ± | 0.1 |
| | RUN 60 CHAR | 0.6 | ± | 0.0 | 20.8 | ± | 0.1 |
| | RUN 61 CHAR | 3.1 | ± | 0.0 | 20.1 | ± | 0.4 |
| LC | PELLET | 0.9 | ± | 0.0 | 36.5 | ± | 0.4 |
| | RUN 62 CHAR | 0.0 | ± | 0.0 | 18.9 | ± | 0.2 |
| | RUN 63 CHAR | 0.5 | ± | 0.0 | 18.1 | ± | 0.3 |
| SBC | PELLET | 0.2 | ± | 0.1 | 43.0 | ± | 0.1 |
| | RUN 64 CHAR | 1.3 | ± | 0.0 | 23.6 | ± | 0.8 |
| | RUN 65 CHAR | 1.1 | ± | 0.1 | 23.7 | ± | 0.5 |
| LB AT 510 C | PELLET | 6.2 | ± | 0.0 | 43.9 | ± | 0.6 |
| | RUN 66 CHAR | 2.2 | ± | 0.0 | 18.8 | ± | 0.4 |

FIG. 6D

| ASH CONTENT (%) AVE | ± | STDEV | FIXED CARBON (%) AVE | ± | STDEV | HHV (MJ/kg) AVE | ± | STDEV | BTU/lb AVE | ± | STDEV |
|---|---|---|---|---|---|---|---|---|---|---|---|
| 7.7 | ± | 0.5 | 48.1 | ± | 0.5 | 24.5 | ± | 0.2 | 10541.4 | ± | 75.1 |
| 3.5 | ± | 0.1 | 58.0 | ± | 0.2 | 27.1 | ± | 0.0 | 11654.6 | ± | 11.8 |
| 11.2 | ± | 0.6 | 47.0 | ± | 0.4 | 23.7 | ± | 0.2 | 10192.9 | ± | 67.8 |
| 17.9 | ± | 1.9 | 44.8 | ± | 1.5 | 22.1 | ± | 0.6 | 9503.4 | ± | 269.7 |
| 13.6 | ± | 2.7 | 55.9 | ± | 1.7 | 24.9 | ± | 0.8 | 10708.4 | ± | 34.1 |
| 13.0 | ± | 1.4 | 67.1 | ± | 1.5 | 27.1 | ± | 0.5 | 11638.0 | ± | 222.1 |
| 30.6 | ± | 1.1 | 32.6 | ± | 0.5 | 17.6 | ± | 0.3 | 7558.9 | ± | 116.6 |
| 38.7 | ± | 1.1 | 36.0 | ± | 0.9 | 16.8 | ± | 0.2 | 7210.5 | ± | 9.7 |
| 39.2 | ± | 0.1 | 35.8 | ± | 0.9 | 18.8 | ± | 0.2 | 8091.0 | ± | 78.6 |
| 33.4 | ± | 0.4 | 30.4 | ± | 0.7 | 16.7 | ± | 0.1 | 7173.2 | ± | 21.3 |
| 42.6 | ± | 0.1 | 39.2 | ± | 0.3 | 16.7 | ± | 0.1 | 7167.3 | ± | 32.5 |
| 11.2 | ± | 0.6 | 47.0 | ± | 0.4 | 23.7 | ± | 0.2 | 10192.9 | ± | 67.8 |
| 18.9 | ± | 0.7 | 41.4 | ± | 0.8 | 21.3 | ± | 0.3 | 9155.6 | ± | 119.7 |
| 23.8 | ± | 0.2 | 55.4 | ± | 0.3 | 23.0 | ± | 0.1 | 9896.6 | ± | 42.0 |
| 23.3 | ± | 0.2 | 56.6 | ± | 0.4 | 23.3 | ± | 0.1 | 10014.1 | ± | 44.0 |
| 21.3 | ± | 0.0 | 42.2 | ± | 0.4 | 21.0 | ± | 0.1 | 9043.0 | ± | 28.1 |
| 27.0 | ± | 0.3 | 54.2 | ± | 0.0 | 22.2 | ± | 0.0 | 9545.8 | ± | 21.1 |
| 27.6 | ± | 0.3 | 54.3 | ± | 0.0 | 22.1 | ± | 0.0 | 9508.9 | ± | 19.2 |
| 5.9 | ± | 0.1 | 51.1 | ± | 0.2 | 25.4 | ± | 0.0 | 10924.4 | ± | 18.2 |
| 7.9 | ± | 0.1 | 68.5 | ± | 0.9 | 28.2 | ± | 0.2 | 12139.9 | ± | 78.1 |
| 7.8 | ± | 0.0 | 68.5 | ± | 0.5 | 28.3 | ± | 0.1 | 12145.4 | ± | 39.2 |
| 10.6 | ± | 0.2 | 46.5 | ± | 0.6 | 23.5 | ± | 0.1 | 10118.9 | ± | 45.9 |
| 25.7 | ± | 0.4 | 55.5 | ± | 0.7 | 22.7 | ± | 0.2 | 9746.8 | ± | 88.0 |

FIG. 6D CONTINUED

BENEFICIATION OF COAL FOR STORAGE, TRANSPORTATION, AND GASIFICATION

RELATED APPLICATION

This application claims the benefit of U.S. Provisional Application No. 62/768,630, filed Nov. 16, 2018, which application is hereby incorporated by reference.

INTRODUCTION

Coal gasification is the process of producing syngas—a mixture consisting primarily of carbon monoxide (CO), hydrogen ($H_2$), carbon dioxide ($CO_2$), methane ($CH_4$), and water ($H_2O$)—from coal. In current practice, coal gasification is primarily used to generate syngas for electricity generation, such as in integrated gasification combined cycle power plants, for production of chemical feedstocks, or for production of methane. Alternatively, coal-derived syngas can be converted into traditional transportation fuels such as gasoline and diesel through additional treatment via the Fischer-Tropsch process or into methanol, which itself can be used as transportation fuel or fuel additive, or which can be converted into gasoline by the methanol to gasoline process.

Coal pyrolysis is the process of breaking material into solid (typically char), liquid (hydrocarbons and oxygenates), and gases (water vapor, CO, $CO_2$, $C_{1-4}$, etc) using heat in an oxygen reduced environment. Coal derived solids, or coal chars, are characterized by high carbon content and may be suitable in various thermal applications such as a boiler fuel (smokeless coal) and ore processing. Non-thermal processes suitable for coal char include serving as filtration media or as precursor to other solid carbon products such as battery electrodes. Coal derived liquids are mix of saturate, aromatic, resin and asphalting compounds. These compounds can have a wide range of molecular weights and can be distilled similar to a crude oil or may be fractionated further into specific chemicals. Gases may be further used for combustion to make electricity, gasified to produce hydrogen, or separated hydrocarbons (e.g. methane or propane) and oxygenated liquids (e.g. alcohols).

Coal varies considerably from mine to mine and comes in different general types (rank) such as bituminous coal, sub-bituminous coal, lignite, and anthracite. The various ranks of coal are more or less efficient when used in thermal processes such as gasification or boiler firing. For example, coal with a higher energy density (e.g., larger BTU/pound or joule/kg) is more cost efficient as a feedstock than coal with a lower energy density.

In particular, lignite coal is low rank and considered a less efficient feedstock for combustion and gasification. Lignite coal, or brown coal, is a soft, brown, combustible, sedimentary rock formed from naturally compressed peat. It is considered the lowest rank of coal due to its relatively low heat content. It has a carbon content of around 60-70 percent.

One of the important reagents in the coal gasification reaction(s) is water. Moisture content needs to be within a critical range for boiler firing. Depending on the type of coal used and its water content, the coal may be dried as a pretreatment prior to thermal processes (e.g., combustion) in order to obtain the correct stoichiometric amount of water for the reaction(s). Preferably this is done at the mine in order to save the cost of transporting large quantities of water only to be later removed prior to gasification. However, some dried coals are often not stable in the ambient environment and may catch fire when stored in outdoor heaps or transported while exposed to natural humidity and/or rainfall.

Beneficiation of Coal for Storage, Transportation, and Gasification

This document describes methods for pretreating coal to create either a dried coal or a char product that is stable in the outdoor environment and is more efficient as a feedstock for gasification or other processes than the original coal. Embodiments of the methods include pulverizing and pelletizing the coal, and pretreating the coal pellets to obtain a stable pellet of either dried coal or a stable pellet of charred coal (coal char). The pelletizing may include adding water to the pulverized coal to obtain a strongly bound pellet. The pretreating may include one or both of drying the coal pellets to obtain a pellet of dried coal and pyrolyzing the coal pellet/dried coal pellet to obtain a char pellet.

The pellets produced using the methods described herein have been shown to be stable in the presence of moisture and resistant to crumbling when handled. Some examples also show an increase in the energy density of the char when compared to the original coal. The pellets created by the described methods have undergone deoxygenation and carbonization improving their handling and storage properties. Pore structures within the pellets are stabilized physically and chemically. Because of this, the self-heating effect of coal, i.e. the uptake of moisture into dry coal resulting in internal heat generation, is greatly reduced. Chars that are stable in high moisture conditions are also, therefore stable against transitions from a dry state to a wet state and less prone (substantially) to self-ignition.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

FIGS. 6A-6E illustrate the results of $sCO_2$ pyrolysis experiments done on a number of different coals.

DETAILED DESCRIPTION

Figure 1:
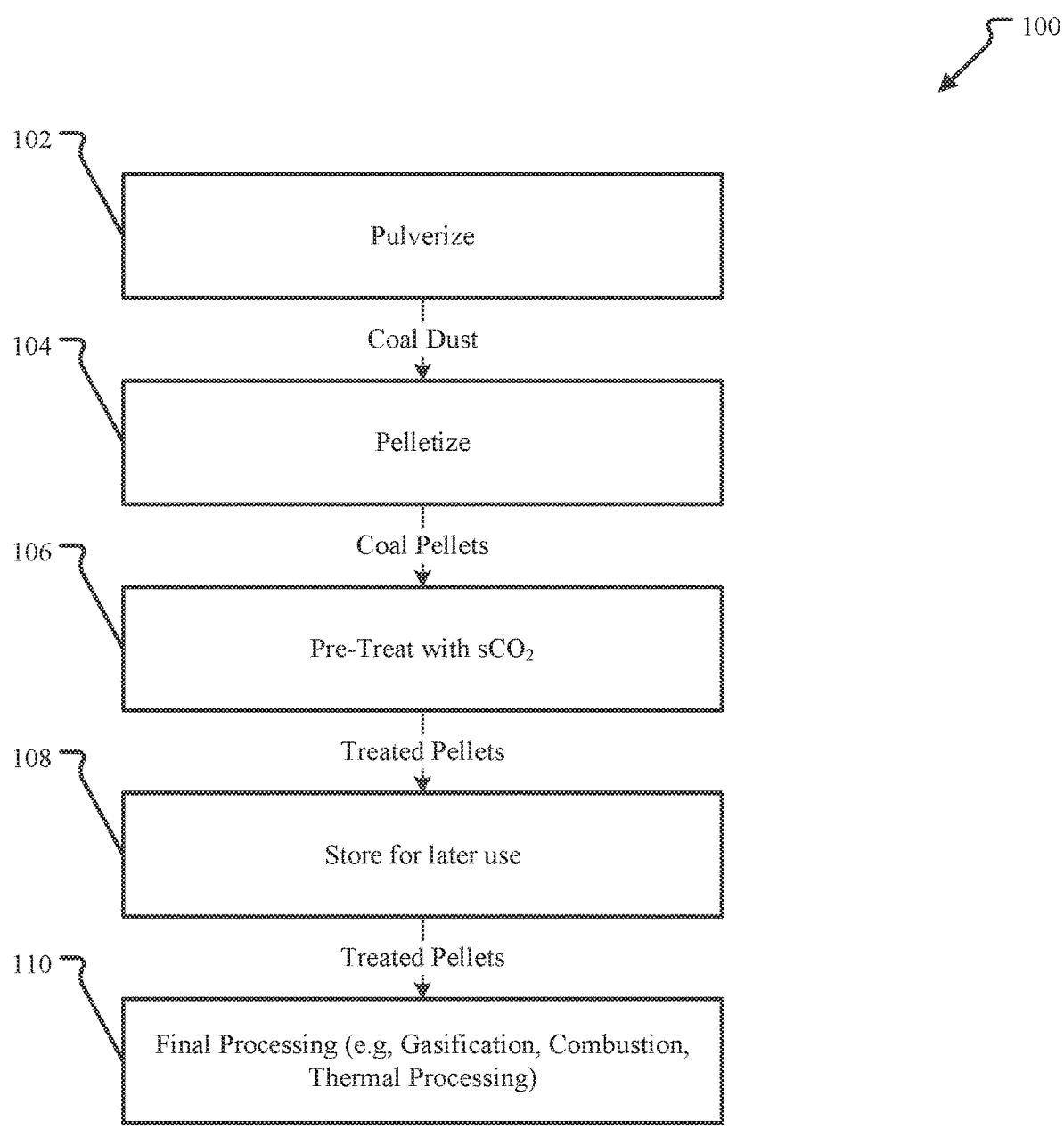
FIG. 1 illustrates a high level embodiment of a method for pretreating coal.

Before the optimized char compositions and methods of manufacture are disclosed and described, it is to be understood that this disclosure is not limited to the particular structures, process steps, or materials disclosed herein, but is extended to equivalents thereof as would be recognized by those of ordinarily skilled in the relevant arts. It should also be understood that terminology employed herein is used for the purpose of describing particular embodiments of the optimized char compositions only and is not intended to be limiting. It must be noted that, as used in this specification, the singular forms "a," "an," and "the" include plural referents unless the context clearly dictates otherwise. Thus, for example, reference to "a step" may include multiple steps, reference to "producing" or "products" of a reaction should not be taken to be all of the products of a reaction, and reference to "reacting" may include reference to one or more of such reaction steps. As such, the step of reacting can include multiple or repeated reaction of similar materials to produce identified reaction products.

For the purposes of this disclosure, dried coal refers to coal that has been held in a chamber at a drying pressure from 7.39-30 MPa and at a temperature from the critical temperature of carbon dioxide up to the boiling point of water at the drying pressure for some amount of time greater than one minute. Char refers to coal (which may be dried coal) that has been held in an oxygen-free atmosphere at a pyrolysis pressure from the supercritical pressure of carbon dioxide up to 30 MPa and at a temperature above the boiling point of water at the pyrolysis pressure up to 650° C. for time on the order of seconds to minutes. Dust refers to particulate material having an average particle size of 1000 microns or less. Pellet refers to a compressed mass of a particulate substance, such as coal, having an average diameter from 1 millimeter (1 mm) to 10 centimeters (10 cm). Pellets, which may alternately be referred to as briquettes, may be in any shape such as spherical, cylindrical, pyramidal, rectangular prism, cubic, or frustoconical to name buy a few possible pellet form factors.

This document describes methods for pretreating coal to create either a dried coal or a char product that is stable in the outdoor environment and is more efficient as a feedstock for gasification or other processes than the original coal. Embodiments of the methods include pulverizing and pelletizing the coal, and pretreating the coal pellets to obtain a stable pellet of either dried coal or a stable pellet of charred coal (coal char). The pelletizing may include adding water to the pulverized coal to obtain a strongly bound pellet. The pretreating may include one or both of drying the coal pellets to obtain a pellet of dried coal and pyrolyzing the coal pellet/dried coal pellet to obtain a char pellet. The pellets produced using the methods described herein have been shown to be stable in the presence of moisture and resistant to crumbling when handled. Some examples also show an increase in the energy density of the char when compared to the original coal.

The pretreatment is performed using a supercritical fluid such as carbon dioxide ($CO_2$). $CO_2$ is supercritical above its critical pressure (7.39 MPa) and critical temperature (31° C.). It is noted herein that above these conditions, $CO_2$, will display unique solvency properties, similar to organic solvents such as hexane, heptane, benzene, and toluene. The nonpolar nature of supercritical $CO_2$ may facilitate the control of undesirable ionic secondary reactions that commonly occur in aqueous environments. While the systems and methods below will be presented in terms of a supercritical carbon dioxide embodiment, any non-aqueous supercritical fluid may be suitable for use in this design such as methane, nitrous oxide, etc.

FIG. 1 illustrates a high level embodiment of a method for pretreating coal. The method 100 is particularly suited for pretreating lower rank coals (e.g., lignite and sub-bituminous coals) into a higher value intermediate product.

In the embodiment shown, coal is first pulverized to a dust in pulverizing operation 102. In an embodiment the coal is pulverized using a hammermill to an average particle size of several thousand microns or less. In certain embodiments, the pulverizing may be done until the average particle size is 1000 microns or less, 500 microns or less, 250 microns or less, 100 microns or less, or even 50 microns or less.

A hammermill is a mill whose purpose is to shred or crush aggregate material into smaller pieces by the repeated blows of little hammers. A hammermill is just one example of a suitable pulverizing system and any pulverizing process or equipment, now known or later developed, may be used including, for example, ball mills, tube mills, ring and ball mills, vertical spindle roller mills, raymond roller mills, and grinding roller mills to name but a few that are known in the art.

The pulverizing operation 102 may be a dry or wet operation. Thus, depending on the embodiment, the product of the pulverizing operation 102 may be a liquid slurry of coal dust, e.g., an aqueous slurry of coal dust, or may be a dry powder product.

After the pulverizing operation 102, a pelletizing operation 104 is performed. Pelletizing refers to the process of compressing or molding a material into the shape of a pellet. A pellet mill, also known as a pellet press, is a type of mill or machine press used to create pellets from powdered material. The pelletizing operation 104 may use any type of pellet or briquette mill or mills or pelletizing process, now known or later developed, to produce coal pellets or briquettes from the coal dust generated by the pulverizing operation 102.

After the pelletizing operation 104, the coal pellets are pretreated in a supercritical carbon dioxide environment in a pretreatment operation 106. The pretreatment operation 106 may include drying the pellets to obtain a dried coal pellet, pyrolyzing the pellets to obtain a pellet of char, or both drying the pellets and then pyrolyzing the dried coal pellets to obtain a char pellet from the dried coal pellet. Each of these will be discussed in greater detail below, however, note that the final product of each will have different properties, i.e., a dried coal pellet will have an energy density and other properties different than either a char pellet generated from a dried coal pellet or a char pellet generated from a coal pellet that was not first subjected to a drying operation. The differences in final properties of the pellets allow a certain flexibility to the operator to tailor the properties of the pellets to meet the needs and economics of the particular end use of the pellets, e.g., gasification, combustion, or other consumptive process.

After the pretreatment operation 106, the pellet product (dried coal pellet or char pellet depending on the embodiment) is suitable for transportation and storing in an exposed outdoor environment in a storage operation 108. The storage operation 108 includes any transportation that may be required. The pretreatment operation 106 produces a pellet that is stable in the presence of water and thus can be stored or transported while exposed to the natural outdoor environment without crumbling or reacting with environmental water or oxygen.

The embodiment of the method 100 shown further includes a final processing operation 110 in which the pellets are consumed. In the embodiment shown the final processing operation is a gasification operation, but any final consumptive process may be used including combustion.

In an embodiment, the properties of the pellets produced by the pretreatment operation 106 may be controlled to improve the economics of the later storage, transportation, and consumptive processes. For example, pellets suitable for outside storage may be produced for use in a gasification process that has a higher energy density than the coal from which the pellets were manufactured and a moisture content that is closer to the desired optimum moisture content of the gasification reaction. In another example, pellets having very low water content may be produced by the pretreatment operation 106 to reduce the transportation costs of the pellets (by not transporting water). Cheap water may then be supplied at the point of gasification resulting in an overall cost savings to the operator.

Figure 2:
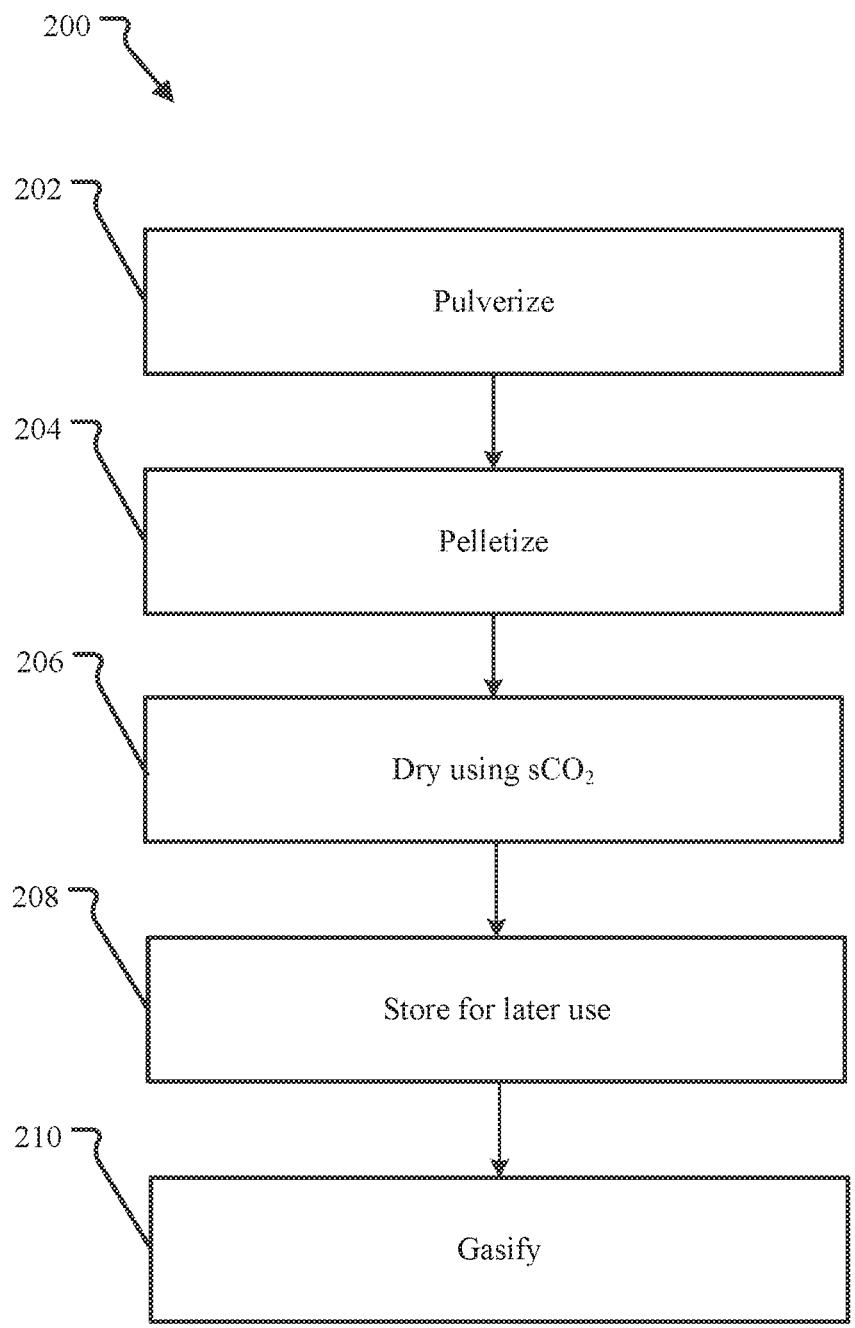
FIG. 2 illustrates an embodiment of a method in which the pretreatment operation is a drying operation.

FIG. 2 illustrates an embodiment of a method in which the pretreatment operation is a drying operation. In the embodiment shown, the pulverizing operation 202, pelletizing operation 204, storage operation 208 and final processing operation 210 are the same as their counterparts described with reference to FIG. 1, above. However, in the method 200 illustrated, the pretreatment operation 106 is a drying operation 206.

The drying operation 206 includes using carbon dioxide in a supercritical state (supercritical carbon dioxide or $sCO_2$) as a drying agent to dry the coal pellets in a drying chamber. The drying is performed in a drying chamber containing $sCO_2$ at a drying pressure from 7.39-30 MPa and at a temperature from the critical temperature of carbon dioxide up to the boiling point of water at the drying pressure. For example, the drying temperature may be from 31° C. (the critical temperature of carbon dioxide)-400° C., from 40-100° C., from 40-275° C., 100-200° C., from 125-175° C., from 140-160° C., or from 150-275° C. (noting that the boiling point of water at 7 MPa is slightly greater than 275° C.). As another example, if the drying pressure is about 12 MPa, the drying temperature may be from 150-325° C. (the boiling point of water at about 12 MPa being about 325° C.).

The coal pellets are maintained in the drying chamber at a drying temperature and pressure for some amount of time greater than one minute. In an embodiment, the coal pellets are dried for from 1 minute to 48 hours. The pressure and temperature need not be constant during the drying operation 206, however, it is preferred that the drying conditions keep the $sCO_2$ in a supercritical state during the entire operation 206.

In an embodiment of the system configured for drying the $sCO_2$, an external condensation system is provided. During the drying operation 206, the $sCO_2$ is circulated within and through the chamber to remove water from the coal pellets. The wet $sCO_2$ is then passed from the chamber to an external condensation system that condenses the water out of the $sCO_2$ or condenses both $CO_2$ and $H_2O$ to a liquid phase. The dry liquid or $sCO_2$ is then passed back into the chamber. The system may be configured as a continuous drying loop or for batch drying.

In an alternative to drying the coal pellets for a fixed, predetermined, period of time, the period of time of the drying may be dynamically determined by directly or indirectly monitoring the moisture content of the coal pellets and drying the coal pellets until a desired moisture content in the coal pellets is obtained. In an embodiment this may be done indirectly by determining the moisture content of the coal pellets produced by the pelletizing operation 204 and monitoring the amount of water removed during the drying operation 206. In an alternative indirect embodiment, given the moisture content of the coal pellets produced by the pelletizing operation 204, a target mass for the dried coal pellets is determined. The mass of the coal pellets in the drying chamber is monitored and the drying operation 206 is terminated when the target mass is obtained. In yet another embodiment, given the moisture content of the coal pellets produced by the pelletizing operation 204, a drying time necessary to obtain a target moisture content in the dried coal pellets may be determined based on empirical data from prior drying operations 206 using the same equipment. In yet another embodiment, the moisture content of coal pellets may be directly monitored during the drying operation, for example by periodically removing one or more pellets and determining their moisture content.

The drying may be done as a batch process, a continuous process, or a semi-batch process as is known in the art. In a batch operation, pellets may be fed into the drying chamber at an ambient pressure and temperature and then the drying chamber may be filled with $sCO_2$ to obtain the proper drying conditions. In a continuous or semi-batch operation, the feeding of pellets into a pressurized chamber is well known in the art and any suitable system, such as those using lock hoppers, may be used.

For example, in a continuous process embodiment, the drying may be performed by passing the coal pellets with the $sCO_2$ through a plug flow dryer, e.g., a long tube, that maintains the coal pellets at the drying temperature and pressure. The flow rate through the dryer is controlled to achieve the desired residence time in the dryer or the desired moisture content in the coal pellets output by the dryer after drying. In an embodiment, the pellets may be discharged into a collection vessel after passing through the dryer. The coal pellets may be stored 208 in the collection vessel for later or immediate use. In an embodiment, the collection vessel could direct feed the dried pellets to a gasification system or reactor for gasification 210.

During the drying operation, water is removed from the coal pellets. Incidentally, some additional compounds having a low volatilization temperature may also be removed from the pellets, although that is not the primary purpose of the drying operation. Such compounds may include mercury, low molecular weight hydrocarbons, and ammonia to name a few.

Figure 3:
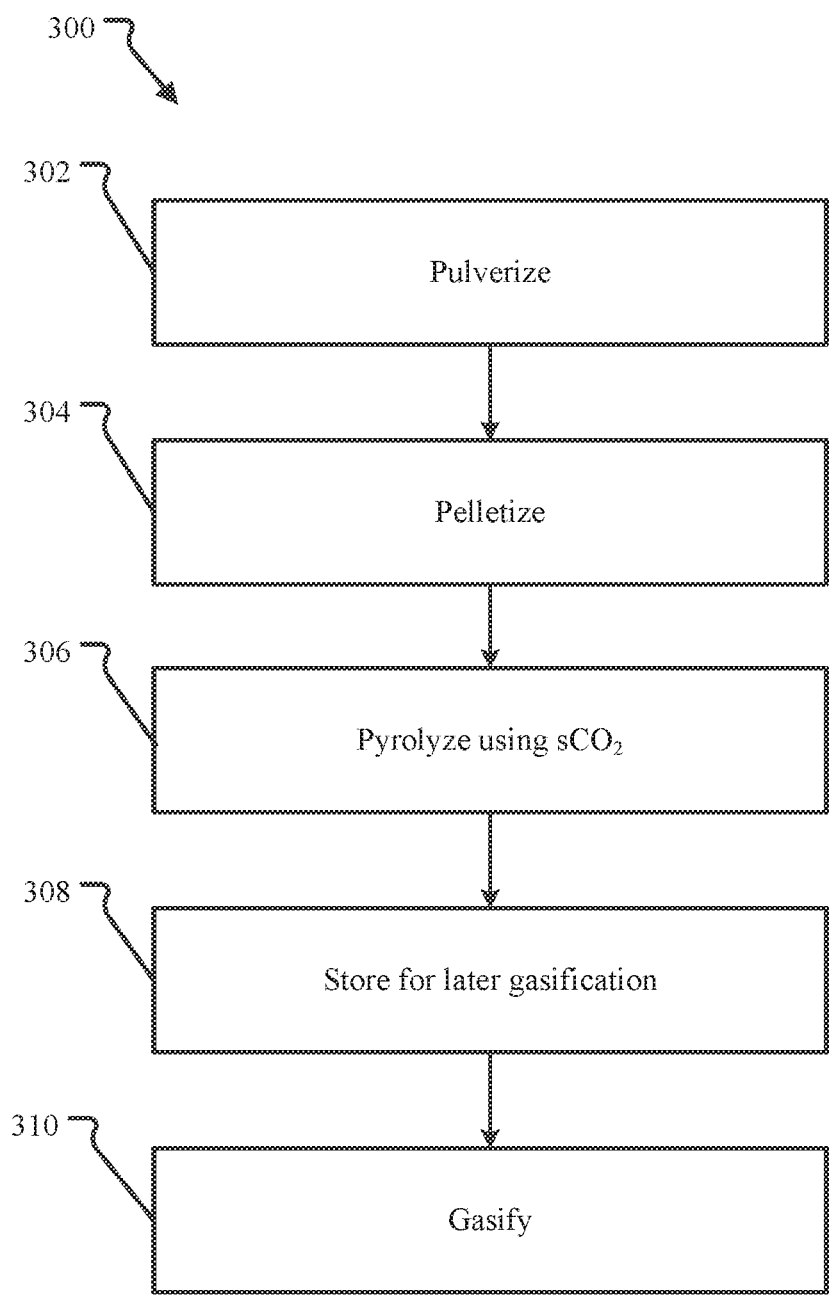
FIG. 3 illustrates an embodiment of a method in which the pretreatment operation is a pyrolysis operation.

FIG. 3 illustrates an embodiment of a method in which the pretreatment operation is a pyrolysis operation. In the embodiment shown, the pulverizing operation 302, pelletizing operation 304, storage operation 308 and final processing operation 310 are the same as their counterparts described with reference to FIG. 1, above. However, in the method 300 illustrated, the pretreatment operation 106 is a pyrolysis operation 306.

Pyrolysis refers to a thermochemical decomposition of organic material at elevated temperatures oxygen-free or substantially oxygen-free environment (i.e., less than 5% $O_2$ by mol). The lack of oxygen reduces the oxidation reaction so that a majority of the organic material decomposes rather than oxidizes. In an embodiment, the reduced oxygen environment is created by using a supercritical carbon dioxide ($sCO_2$) environment that includes less than 1 mol % oxygen in the feed $sCO_2$. Depending on how a pyrolysis system is configured and operated, different pyrolysis products can be obtained. Reaction products include low molecular weight hydrocarbons (e.g., $C_1$-$C_4$ hydrocarbons) and higher molecular weight hydrocarbons (e.g., $C_5$-$C_{20}$ hydrocarbons) which may be in the form of oils and tars when recovered and returned to room temperature and pressure. Other reaction products are also possible including CO, $CO_2$, $CH_4$, $H_2$, and amines.

In the method 300, the pyrolysis operation 306 includes using carbon dioxide in a supercritical state (supercritical carbon dioxide or $sCO_2$) as a heat transfer fluid to pyrolyze the coal pellets in a pyrolysis chamber. The pyrolysis is performed in the pyrolysis chamber containing $sCO_2$ at a pyrolysis pressure from 7.39-30 MPa and a temperature from the boiling point of water at the pyrolysis pressure up to 650° C. For example, the pyrolysis temperature may be from 350-650° C., from 400-650° C., from 450-650° C., from 450-550° C., 500-650° C., or from 550-650° C.

The coal pellets are pyrolyzed in the reaction chamber at a desired pyrolysis temperature and pressure for some amount of time greater than at least one second. In an embodiment, the coal pellets are pyrolyzed for from 1 second to 48 hours. More narrow ranges include from 1 minute to 48 hours, 10 minutes to 24 hours, from 10 minutes to 2 hours, from 30 minutes to 1.5 hours and from 45 minutes to 75 minutes. Additional ranges made by using the low end of one of the ranges provided above and a high end from a different range provided above (e.g., from 1 second to 75 minutes) are suitable as well.

In an alternative embodiment, the pyrolysis operation 306 may be performed until the pellets are no longer losing mass at an appreciable rate. This may be done by monitoring either the mass of the pellets or the mass of recovered reaction products during the pyrolysis operation 306 and terminating the operation upon achieving a predetermined target for pellet mass, or reduction of mass of recovered reaction products, or a predetermined target for a rate of change of the pellet mass or recovered reaction product mass.

The pressure and temperature need not be constant during the pyrolysis operation 306, however, it is preferred that the pyrolysis conditions keep the $sCO_2$ in a supercritical state during the entire operation 306. During the pyrolysis operation 306 the $sCO_2$ may be circulated within the reaction chamber so that pyrolysis products evolved from the coal pellets are dissolved or otherwise retained in the $sCO_2$. The $sCO_2$ and pyrolysis products may then be removed from the chamber and more fresh $sCO_2$ provided until the desired level treatment is obtained. In an embodiment, the system may circulate the $sCO_2$ through a circuit, or loop, that includes the reaction chamber and a condensation system configured to remove the pyrolysis products from the $sCO_2$ and return fresh $sCO_2$ back to the reaction chamber. Pyrolysis products evolved from the coal pellets during the operation are removed with the circulating $sCO_2$. In an alternative embodiment, instead of a recirculating loop, the $sCO_2$ from the chamber, after removal of the pyrolysis products, is not recovered for reuse as fresh $CO_2$. As the primary purpose of this method 300 is to generate an improved char product, the pyrolysis reaction products are incidental to the process. Such reaction products may be recovered by separation of the products from the $sCO_2$ in a separation operation (not shown) and sold or otherwise disposed of.

Figure 4:
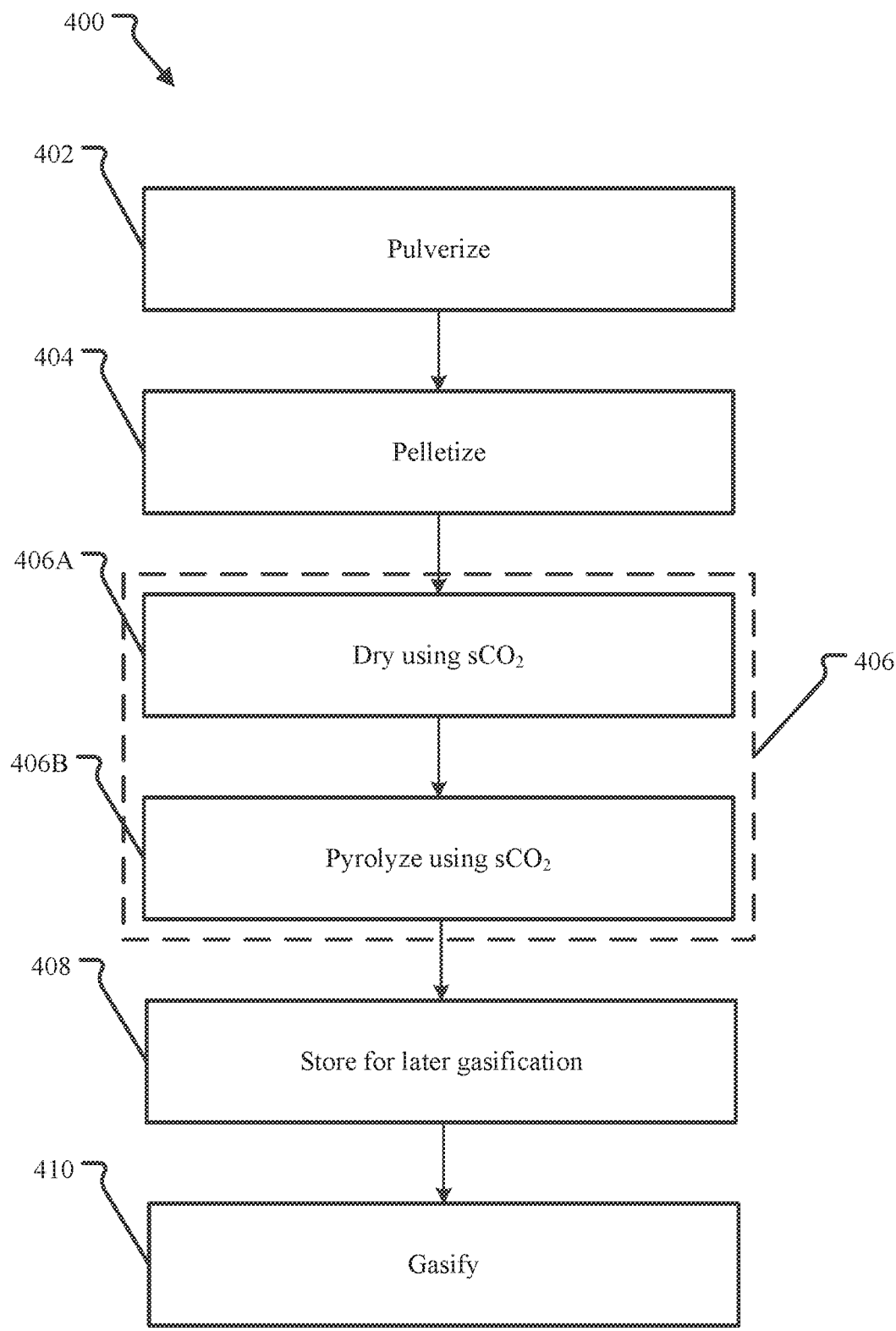
FIG. 4 illustrates an embodiment of a method in which the pretreatment operation includes both a drying operation and a pyrolysis operation.

FIG. 4 illustrates an embodiment of a method in which the pretreatment operation includes both a drying operation and a pyrolysis operation. In the embodiment shown, the pulverizing operation 402, pelletizing operation 404, storage operation 408 and final processing operation 410 are the same as their counterparts described with reference to FIG. 1, above, and thus may be gasification, combustion or any other consumptive process. However, in the method 400 illustrated, the pretreatment operation 406 includes a drying operation 406A that is the same as the drying operation 206 described above with reference to FIG. 2, and a pyrolysis operation 406B that is the same as the operation 306 described above with reference to FIG. 3.

In an embodiment, the drying and the pyrolysis may be performed in different reactors or reactors with different configurations. In an alternative embodiment, the drying operation maybe be performed in the same reaction chamber in which the pyrolysis is performed.

Figure 5:
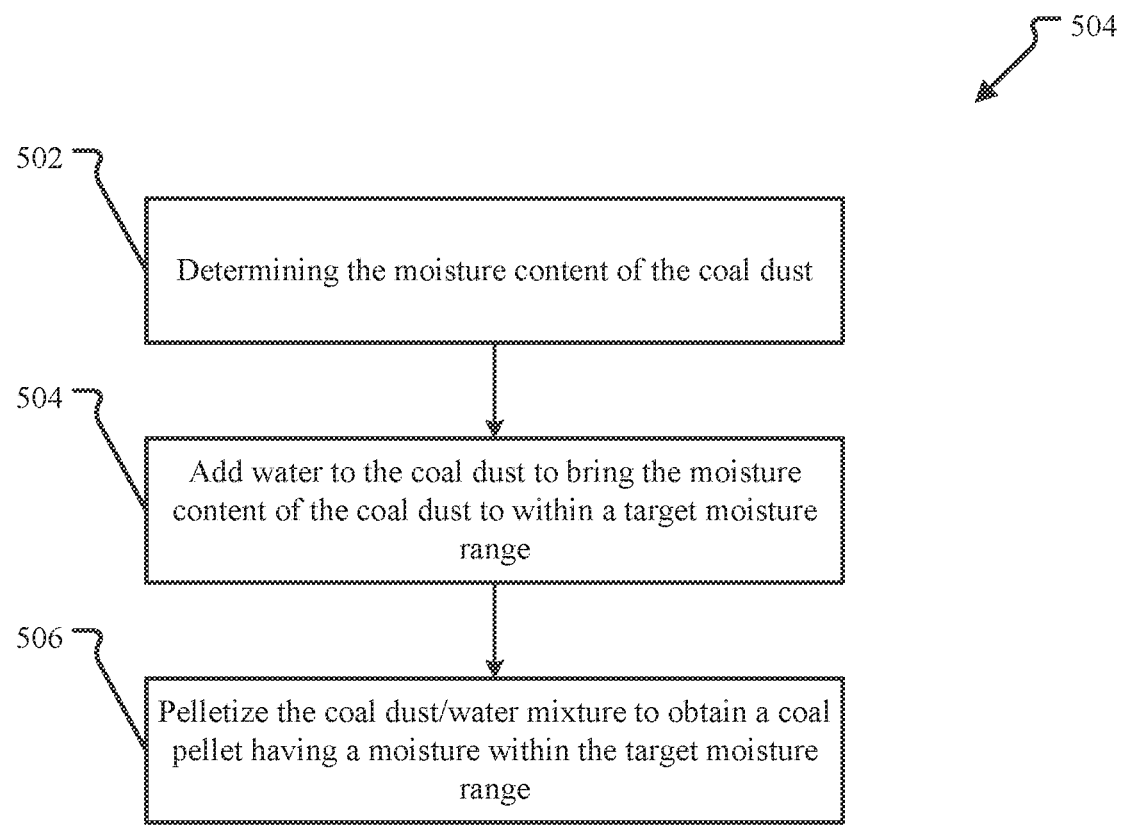
FIG. 5 illustrates an alternative embodiment of a pelletizing operation that could be used in any of the methods of FIGS. 1-4.
Figure 6E:
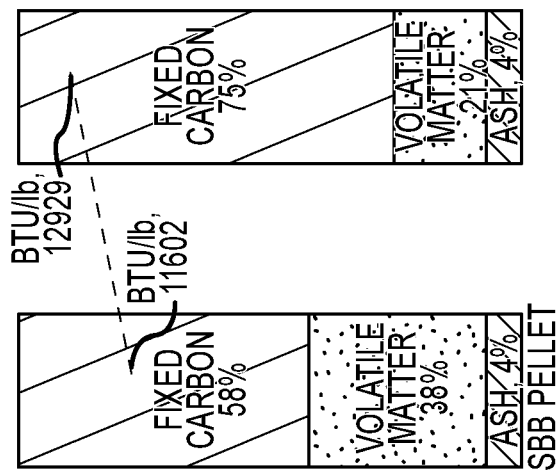
Figure 6E:
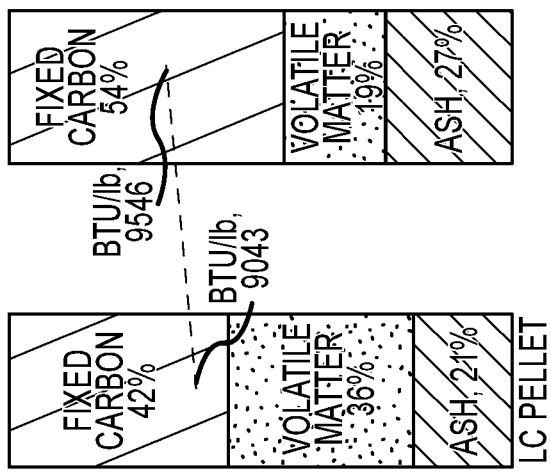
Figure 6E:
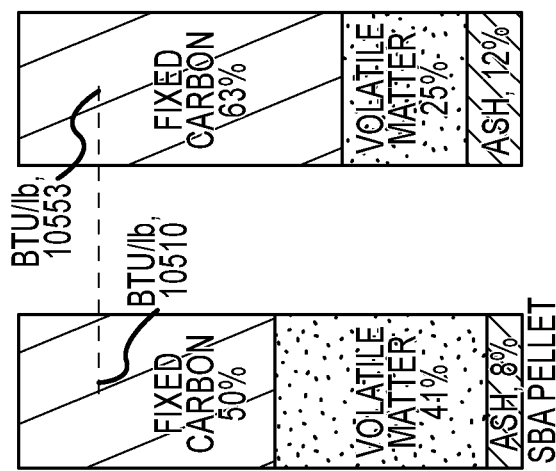
Figure 6E:
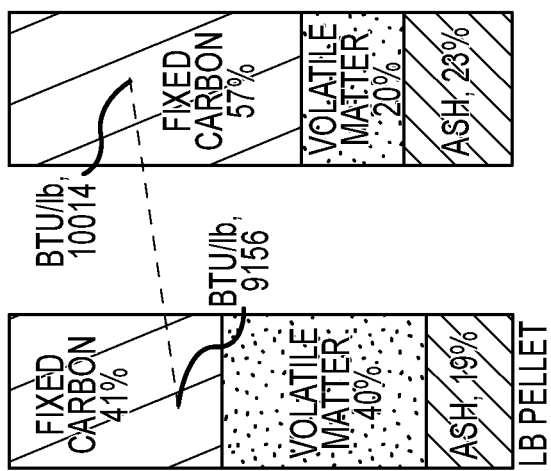
Figure 6E:
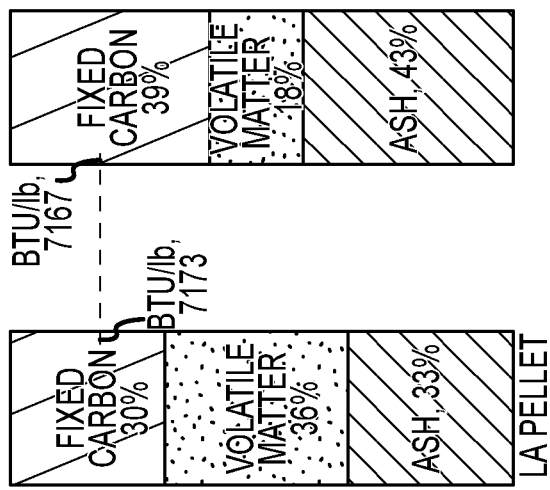
Figure 6E:
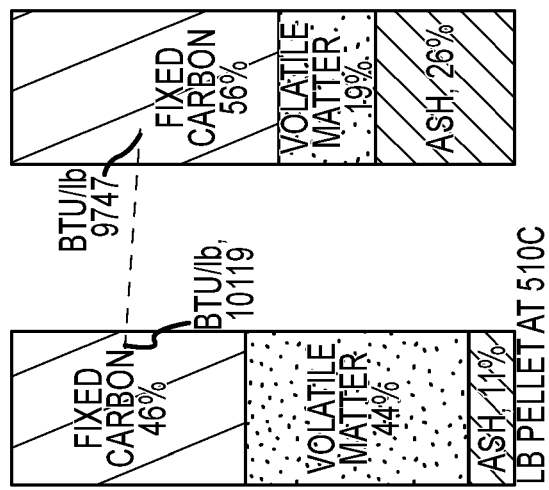
Figure 6E:
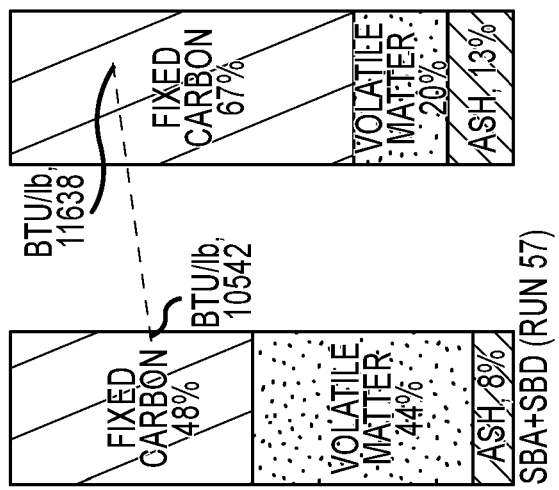
Figure 6E:
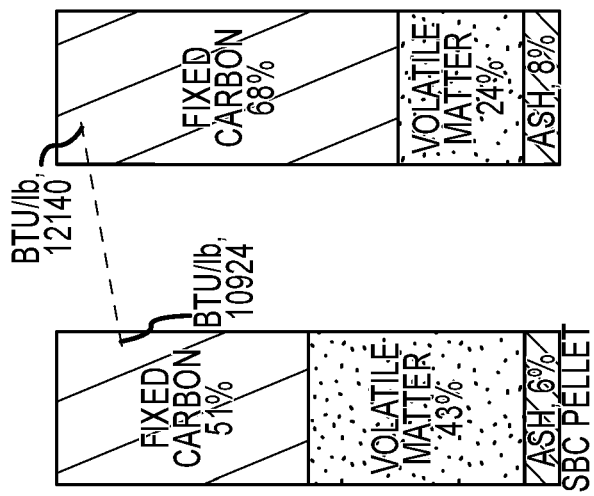

FIG. 5 illustrates an alternative embodiment of a pelletizing operation that could be used in any of the methods of FIGS. 1-4. In the embodiment shown in FIG. 5, water is added to the coal dust to achieve a target moisture content in the resulting coal pellet. It has been determined that a more stable pellet (a pellet less susceptible to crumbling) is created by the pretreatment operations 106, 206, 306, and 406 if the coal pellets from the pelletizing operation have a moisture content from 10-35% by weight. Although it is counterintuitive to increase the water content in the pelletizing operation only to remove some or all of that water in the subsequent pretreatment operation, experiments described below show that moisture management of the coal pellets improves the performance of the final pellet product of the methods described in FIGS. 1-4.

In the embodiment of the pelletizing operation 504 shown in FIG. 5, the moisture content of the coal dust is determined in a monitoring operation 502. This may be done by continuous or spot sampling of the coal dust coming out of the pulverizing operation or by monitoring the water content of the coal fed into the pulverizing process. The monitoring of moisture in coal is well known in the art and any suitable method may be used at any point in the process. In yet another embodiment, the moisture content of the coal pellets exiting the pelletizing operation may be monitored to determine if the pellets meet the target moisture range.

Regardless of how the moisture content is determined, if the amount of water is too low to produce a coal pellet having a moisture within the target range, water is added in a water adjustment operation 504. In an embodiment, water is added to the dust in an amount sufficient to obtain a final pellet having from 10-35% by weight water. In alternative embodiments, final pellet water contents are from 15-30% or even 20-30% water by weight. Note that in the pelletizing process some water from the input dust is removed, either physically by being squeezed out or by vaporization/evaporation. Thus, to get a pellet with a final water content in the 10-30 wt. % range the dust must have a higher water content prior to palletization. Therefore, the target water concentration of the dust input into the palletization process is from 35-50%, 40-50%, 45-50%, 30-45%, 30-40%, 30-35%, 40-45%, 40-50%, 35-45% or 35-40%, all by weight. The addition of water may be done after the pulverizing operation or by controlling the amount of water used in a wet pulverizing operation so that the coal dust slurry output by the pulverizing equipment is simply passed to the pellet mill for processing.

In an alternative embodiment, if the amount of water in a coal dust slurry is in excess of the target concentration, then water may be removed from the coal dust in the water adjustment operation 504. In an embodiment, this may be done by filtering, evaporation, gravity separation, or any other known technique. The removed water may be reused in the pulverizing operation if necessary.

After the desired amount of water in the coal dust is achieved, a pelletizing operation 506 is performed. Because the water content of the coal dust was managed as described above, the pelletizing operation 506 generates coal pellets having a water content within the target range for optimal stability of the ultimate treated pellet product produced by the pretreatment operation 106.

The drying and pyrolysis operations described above may be performed in any suitable reactor. For example, in one embodiment drying and/or pyrolysis operations may be performed in a fast pyrolysis reactor. A fast pyrolysis reactor may include any thermochemical reaction chamber capable of carrying out a thermochemical decomposition of organic molecules in the absence of oxygen (or in a reduced oxygen environment) within approximately three seconds. Fast pyrolysis is generally described by Roel J. M. Westerhof et al. in "Effect of Temperature in Fluidized Bed Fast Pyrolysis of Biomass: Oil Quality Assessment in Test Units," Industrial & Engineering Chemistry Research, Volume 49 Issue 3 (2010), pp. 1160-1168, which is incorporated herein by reference in the entirety. Pyrolysis processes are also generally described by Ayhan Demirbas et al. in "An Overview of Biomass Pyrolysis," Energy Sources, Volume 24 Issue 3 (2002), pp. 471-482, which is provided as evidence of the state of the art for all it teaches.

EXAMPLES

FIGS. 6A-6E illustrate the results of $sCO_2$ pyrolysis experiments done on a number of different coals. These coals included several sub-bituminous coals and one mixture of coals, the coals identified as SBA, SBB, SBC, and SBD. Lignite coals were also studied, identified as LA, LB and LC. The experiments performed used pyrolysis as the pretreatment and were performed as discussed with reference to FIG. 3. The various operational parameters such as pyrolysis temperature, pyrolysis pressure and pyrolysis duration (period of time) are provided in FIGS. 6A-6B for different experiments on different coals. The yield percentages of both char pellets and pyrolysis reaction products (referred to generically as "oil" in FIGS. 6A-6B) are provided.

FIGS. 6C-6D show a comparison of the properties of coal pellets to the char pellets for various coals. Experiments show that the char pellet product of the pyrolysis operation are 28-40% smaller than the coal pellets input into the pyrolysis chamber. The size reduction is due to the removal of the reaction products from the coal pellets. This size reduction is one reason for the increase in volumetric energy density observed in the char pellets from the above described methods.

Furthermore, it was observed that the pyrolyzed char pellets exhibited greater stability in the presence of water than dried coal pellets that had not been pyrolyzed. This was confirmed by placing char pellets in a bucket of water. Dried pellets that were originally pelletized without adding water were observed to break down back into coal dust in water quickly (in less than a day) whereas pyrolyzed pellets maintained their stability as a pellet for more than a month. Furthermore, char pellets that were originally pelletized using the method of FIG. 5 that added additional water to obtain a coal pellet having from 10-35% showed even better stability in the presence of water.

Pyrolyzed char pellets are have undergone deoxygenation and carbonization. Pore structures within the pellets are stabilized physically and chemically. Because of this, the self-heating effect of coal, i.e. the uptake of moisture into dry coal resulting in internal heat generation, is greatly reduced. Chars that are stable in high moisture conditions are also, therefore stable against transitions from a dry state to a wet state and less prone (substantially) to self-ignition.

The energy density of the pellets is generally increased by the pyrolysis method of FIG. 3. This is illustrated graphically in FIG. 6E. Note, in FIG. 6E the absolute mass of ash in each coal is believed to be relatively unchanged by the pretreatment process so that the increase in ash weight percentage observed after processing directly relates to the amount of mass loss in the evolution of reaction products from the sample during pyrolysis.

Figure 7:
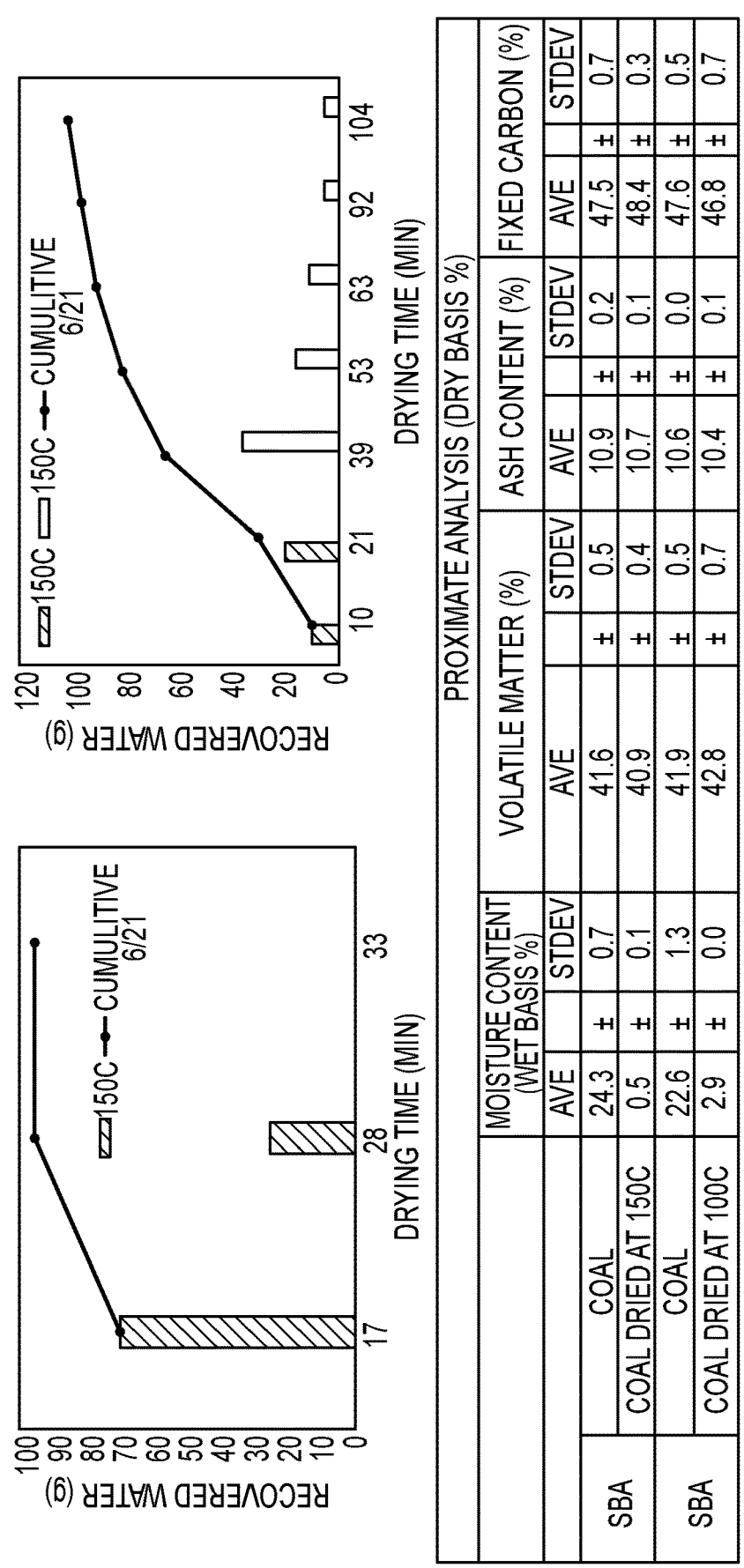
FIG. 7 illustrates the effects of $sCO_2$ drying on the SBA coal.

FIG. 7 illustrates the effects of $sCO_2$ drying on the SBA coal. Experiments were conducted using the drying pretreatment method of FIG. 2 while varying the temperature and monitoring the amount of water removed as the experiment progressed. In the experiment, the untreated coal had a water content ranging from 22.6-24.3% by weight (on a wet basis). One experiment was performed with the drying temperature at 150° C. and another with the drying temperature at 50° C. for 21 minutes and then increased to 100° C. to compare the difference in drying temperatures.

A batch system suitable for use in some of the methods described above is provided in commonly-assigned U.S. Published Application No. 2018/0291275 titled Flexible Pyrolysis System and Method which is incorporated herein by reference.

Figure 8:
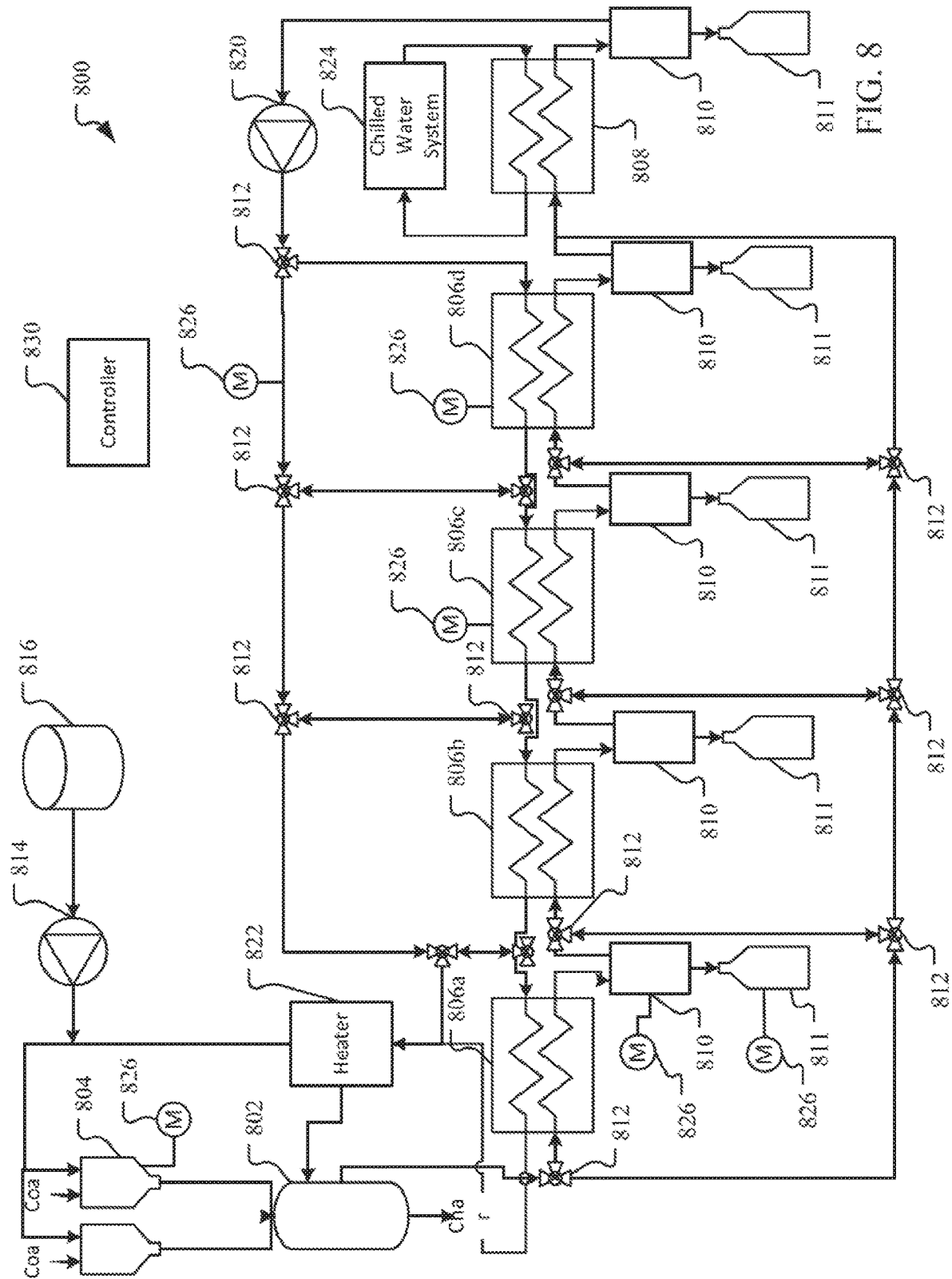
FIG. 8 illustrates a continuous feed closed-loop $CO_2$ pyrolysis system similar in operation to those described above that is suitable for use in the methods described above.

FIG. 8 illustrates a continuous feed closed-loop $CO_2$ pyrolysis system similar in operation to those described above that is suitable for use in the methods described above. In the embodiment shown in FIG. 8, the pyrolysis chamber is a column 802 alternatively fed with coal by a set of lock hoppers 804 (two are shown) so that there is a continuous flow of coal into the column 802. The lock hoppers 804 receive coal at a low pressure and then are pressurized with $sCO_2$. Upon reaching the appropriate pressure and temperature for transfer to the pyrolysis chamber 802, the lock hopper 804 is opened and coal/$sCO_2$ mixture flows into the pyrolysis chamber 802. Continuous feed is achieved by alternating flow between lock hoppers 804 so that one lock hopper 804 is always feeding the pyrolysis chamber 802 while the other lock hopper 802 is being recharged with coal and repressurized. Other methods of feeding coal and $sCO_2$ continuously into a reactor are possible and any suitable system may be used.

The pyrolysis chamber 802 may receive additional heat from an outside source to heat the coal to the pyrolysis temperature. In the embodiment shown, the pyrolysis chamber 802 is shown receiving additional heat via a high temperature $sCO_2$ stream from the heater 822. In addition or alternatively, the pyrolysis chamber 802 may receive heat from other sources such as external or internal heating elements such as a heating jacket or electrical heating element.

The pyrolysis chamber 802 may be a simple cylindrical or other shaped pressure vessel without any internal components. Alternatively, the pyrolysis chamber 802 may be a fluidized bed reactor, a stirred reactor, a plug flow reactor or any other suitable design. In an embodiment, the reactor may be provided with agitators or screws for moving the coal during the pyrolysis. In a fluidized bed reactor embodiment as shown, the coal may be agitated due to the flow of the heating stream of $sCO_2$ provided from the heater 822. While only one pyrolysis chamber 802 is shown, in an alternative design, multiple reactors in parallel or in series may be used to increase the flow rate or to control the pyrolysis reaction.

As shown, as inlet stream of coal and $sCO_2$ continuously enters the pyrolysis chamber 802. By controlling the flow rate, the residence or contact time of the $sCO_2$ with the coal may be controlled as is known in the art in order to control the amount of dissolved reaction products in the $sCO_2$ observed in the outlet stream of the chamber. In an embodiment, the coal/$sCO_2$ mixture entering the pyrolysis chamber 802 can range in temperature from 31-650° C. and in pressure from 7.39-30 MPa so that the $CO_2$ is in a supercritical state at the time of transfer of the mixture. Lower or higher temperatures and pressures may also be used.

In an embodiment, a drying operation, as described above, may be performed in the lock hoppers prior to transfer of the coal/$sCO_2$ mixture to the pyrolysis chamber 802. Moisture is removed from the lock hopper 804 as it is performing the drying operation so that the target moisture content can be obtained as a pretreatment operation prior to bringing the coal up to desired transfer temperature and pressure.

Lock hopper drying may be achieved in several different ways. In one embodiment, hot, but not supercritical, $CO_2$ obtained from somewhere in the $CO_2$ loop (for example, from the output of the final stage separator 810 before the pump 820) is passed through the lock hopper and then removed. The $CO_2$ and water may then be wasted (e.g., discharged to the atmosphere) or the water may be separated from the $CO_2$ and the $CO_2$ returned to the $CO_2$ loop, for example just before the pump 820). Alternatively, supercritical $CO_2$ may be used in the lock hopper for drying. Again, the $sCO_2$ is flowed through the lock hopper at the desired drying temperature and pressure, thus removing the moisture from the lock hopper, until the target moisture content is achieved. Again, the $sCO_2$ may be recycled by sending the $sCO_2$ through a heat exchanger to condense the water out or the $sCO_2$ may be wasted. In another embodiment, another heated gas such as air, argon, nitrogen, or other gas or mixture of gases may be passed through the lock hopper for drying. In yet another embodiment, the lock hoppers may be externally heated to remove water from the coal and then flushed with a gas to purge to moisture from the lock hopper prior to bringing the coal up to desired transfer temperature and pressure and transferring the coal to the pyrolyzer.

After contacting and pyrolyzing the coal, $sCO_2$ exits the pyrolysis chamber 802 with dissolved pyrolysis products as described above. In an embodiment, the $sCO_2$ output from the pyrolysis chamber 802 may be passed through a separator (not shown) such as a hydrocyclone or other solid/fluid separator such as a settling device or electrostatic precipitator to remove any solid fines from the $sCO_2$ stream.

The output $sCO_2$ is then passed through a recuperating and condensing circuit that removes the dissolved pyrolysis products and then recuperates the $CO_2$ for reuse in the pyrolysis chamber 802. The recuperating and condensing circuit includes a series one or more recuperators 806 that simultaneously cool the $CO_2$ stream output by the pyrolysis chamber 802 while preheating the inlet/return stream of $CO_2$ (in which the products have mostly been condensed out of the stream) delivered to the chamber 802. In the system 800 shown, four recuperators 806 are illustrated, a first stage recuperator 806a, a second stage 806b, a third stage 806c and a fourth stage 806d. More or fewer recuperators 806 may be used as desired, as described below.

The recuperators 806 may be any type of heat exchanger now known or later developed. In an embodiment, for example, the recuperators 806 are each tube-in-tube heat exchangers with the output $CO_2$ in the outer tube and the cooler, inlet $CO_2$ stream flowing through the inner tube. However, any type of heat exchanger including shell and tube, plate, plate and frame, or other type may be used.

In addition to the recuperators 806, an optional final cooling heat exchanger 808 stage may be provided as part of the recuperating and condensing circuit to perform the final reduction of temperature of the $CO_2$ to the desired low temperature of the circuit. This is achieved using a coolant, such as chilled water from a chilled water system 824 as shown, to perform the final cooling of the output stream. As with the recuperators 806, the final heat exchanger 808 if utilized may be any type of heat exchanger.

As mentioned above, the supercritical conditions for $CO_2$ are a temperature above 31.1° C. and pressures above 7.39 MPa. In describing the system, $CO_2$ will be referred to as supercritical even though at some points in the system the conditions may fall below the critical point in either temperature or pressure. In those points, it should be understood that the $CO_2$ may be in a gas or liquid state depending on the temperature and pressure conditions. Such states may occur, for example, downstream of the pyrolyzer 802 such as in the fourth recuperator 806d or the final heat exchanger 808.

For example, in an embodiment the low $sCO_2$ circuit temperature may be less than 50° C. such as room temperature (20° C.) and the low pressure may be from 6-8 MPa. Lower temperatures and pressures may also be used. In this embodiment, the $CO_2$ is allowed to go subcritical in order to remove as much of the pyrolysis products as possible. In an alternative embodiment, the circuit temperatures and pressures are maintained so that the $CO_2$ remains in a supercritical state throughout the system 800.

In the embodiment shown, after each heat exchanger in the circuit, there is a separator condensation collection system including a separator 810 and a collection vessel 811. Each separator 810 is at a subsequently lower temperature, from left to right. The separator 810 may be any type of active or passive condensing apparatus. For example, in the embodiment shown the separator 810 is a cold finger condenser that provides a temperature-controlled surface over which the $CO_2$ flows. The system causes any pyrolysis products condensable at or above the controlled temperature to be removed by the separator 810 and collected in the collection vessels 811. In an alternative embodiment, the separator 810 is a cyclonic gas-liquid separator such as a gas liquid cylindrical cyclone (GLCC). Other possible condensation vessels include Liebig condensers, Graham condensers, coil condensers, and Allihn condensers, to name but a few.

Where appropriate, the term 'process stream' will be used to refer to the $CO_2$ stream in the portion of the $CO_2$ circuit with $CO_2$ flowing from the pyrolysis chamber 802 through the last condensation separator 810, while 'return stream' or 'inlet/return stream' will be used to refer to the $CO_2$ stream flowing through the circuit from the last separator, through the pump 820 and, ultimately, back into the pyrolysis chamber 802 and/or lock hoppers 804. Note that the return stream may not be completely pure $CO_2$ but will likely contain at least trace amounts of reaction products, water or other compounds that are not completely collected in the condensation vessels. The process stream, on the other hand, depending on the location within the circuit will contain at least some and possibly very large amounts of pyrolysis reaction products that will be sequentially removed by the various separators 810.

In the embodiment shown, the different recuperators may be operated at different temperatures. For example, in an embodiment the first recuperator 806a may receive the process stream of $CO_2$ and dissolved reaction products at about 550° C. and discharge it at about 450° C. (as used herein 'about' means+/−10% and all temperatures and pressures discussed with reference to FIG. 8 should be considered to be 'about' the stated temperature or pressure unless explicitly stated otherwise). The second recuperator 806b may receive the 450° C. stream and discharge it at 300° C. The third recuperator 806c may receive the 300° C. stream and discharge it at 150° C. The fourth recuperator 806d may receive the 150° C. stream and outputs it at 50° C.

The return stream of $CO_2$ is partially reconditioned by a pump/compressor 820 that brings the $CO_2$ back up to operating pressure (e.g., approximately 10 MPa) and a heater 822 to provide additional heat to the $CO_2$ to bring it up to the desired lock hopper 804 temperature. For example, in an embodiment, the pump/compressor 820 receives $CO_2$ at about 10 MPa and compresses the stream to about 30 MPa, which provides sufficient pressure to maintain the flow through the entire $CO_2$ circuit without any additional pumps. The heater 822 may be a single heating unit or multiple units in parallel and/or in series depending on operator preference. For example, in an embodiment, three separate heaters in series are provided that receive the recuperated $CO_2$ stream from the first recuperator 806a and heat the stream from an inlet temperature of about 450° C. to about 550° C. Likewise, there may be a single pump 820 as shown, or multiple pumps distributed throughout the $CO_2$ circuit. For example, in an embodiment in which a portion of circuit is below supercritical conditions, a dedicated heater and/or compressor (not shown) may be provided purely to recondition the $CO_2$ to supercritical.

By providing multiple stages of pairs of heat exchangers 806, 808 followed by separators 810, the pyrolysis products may be fractionated and collected by condensation temperature. This allows desired specific fractions to be easily separated as part of the recuperation process. By providing more or fewer stages, greater or lesser differentiation of the fractions may be achieved, as well as controlling the makeup of each fraction.

In addition to having multiple stages of heat exchangers 806, 808 followed by separators 810, further flexibility is obtained through the use of a bypass circuit created by a number of bypass valves 812 in the output $CO_2$ portion of the circuit and the inlet/return $CO_2$ portion of the circuit. In an embodiment, one or more of the heat exchangers are equipped with bypass capability allowing that exchanger to be completely or partially bypassed by either or both of the pyrolysis output stream and the inlet/return stream. In the embodiment shown, various bypass valves 812 are provided that allow each of the different stages to be either completely or partially bypassed as desired by the operator. At any bypass valve 812, the operator may select how much of the input stream is directed to either outlet of the valve. This level of flow control provides significant flexibility in the operation of the system 800 and allows further operational control over where in the system the various fractions of the pyrolysis products are collected.

The pyrolysis system 800 may further be provided with additive injection systems for injecting additives into the $CO_2$ inlet/return stream prior to delivery to the pyrolysis chamber 802. In the embodiment shown, two additive injection systems are shown, each including an injection pump 814 and an additive supply 816. Examples of additives, described in greater detail above, include Hz, $H_2O$, formic acid, and tetralin. In an embodiment, the injection pump 814 is an HPLC injection pump. In another embodiment the pump is an industrial piston pump, axial, or centrifugal compressor.

In yet another embodiment (not shown), bypass valves 812 may be provided to allow one or more separators 810 to be bypassed. This allows collection of reaction products to be combined into fewer vessels 811 as desired, thus further increasing the flexibility of the system 800.

A controller 830 is illustrated in FIG. 8. In an embodiment, the controller 830 is a programmable logic controller configured to monitor and control the pyrolysis system 800 to achieve desired results. Controllers may be implemented in many different manners, from purpose built hardware controllers to general purpose computing devices executing control software. Process controllers are well known in the art and any suitable controller design or combination of designs now known or later developed may be used.

The controller 830 controls the distribution of the flow of the process stream and the return stream through the various stages of recuperators. In this way, the inlet and outlet temperatures of the streams at each stage may be altered. The heat transfer equations governing the heat exchange between hot and cold streams in a heat exchanger are well known and any form of these equations may be used by the controller to determine the distribution of the flows among the stages in order to get specific temperatures at specific locations in the $CO_2$ circuit. For example, one basic heat exchanger equation that may be used is a general counterflow heat exchange equation describing the transfer of heat between two streams in a heat exchanger:

$$\dot{m}_a c_{pa}(T_{a1}-T_{a2})=\dot{m}_b c_{pb}(T_{b2}-T_{b1})$$

where $\dot{m}_a$ is the mass flow rate of the process stream, $c_{pa}$ is the specific heat of the process stream, $T_{a1}$ is the inlet (high) temperature of the process stream entering the recuperator stage, $T_{a2}$ is the outlet (low) temperature of the process stream, $\dot{m}_b$ is the mass flow rate of the return stream, $c_{pb}$ is the specific heat of the return stream, $T_{b1}$ is the inlet (low) temperature of the return stream entering the recuperator stage, and $T_{b2}$ is the outlet (high) temperature of the return stream. From the above equation, as is known in the art, additional equations can be derived which mathematically describe the performance of the recuperator, often in terms of an overall heat transfer coefficient for the recuperator based on its dimensions and characteristics. In many cases the performance equations for a heat exchanger may be provided by the manufacturer. Such equations, as necessary, are solved by the controller to determine how to distribute the flow of the streams through the recuperator stages in order to achieve the goals set by the operator, examples of which are provided below.

In an embodiment the controller 830 is connected and capable of controlling the bypass valves 812, the heater 822, the chilled water system 824, additive pumps 814, and other components of the system 800. In addition, the controller 830 may be connected to or otherwise receive information or signals from one or more monitoring devices 826, from which the controller 830 receives data regarding the status of the system 800.

FIG. 8 illustrates several monitoring devices 826 at various locations throughout the system 800. Monitoring devices 826 may be any type of process monitor, analyzer, or sensor such as, for example, flow sensors, temperature sensors, pressure sensors, scales, pH sensors, spectrometers, photo-ionization detectors, gas chromatographs, catalytic sensors, infra-red sensors and flame ionization detectors, to name but a few. Monitoring devices may be located anywhere in the system 800 as desired. For example, in an embodiment a gas chromatograph may be used to periodically or continuously monitor and determine the different compounds and their relative amounts in the reaction products in the $sCO_2$ leaving the reaction chamber 802. Alternatively, liquid level sensors on each condensation vessel may be provided and based at least in part upon the liquid level sensor data, the relative production rate of each recuperator stage's condensates may be determined.

Based on information received from the monitoring devices 826, the controller 830 may change the flow through one or more bypass valves and the temperatures of one or more streams to obtain a desired hydrocarbon condensate fraction (i.e., range of molecular weights) in one or more of the condensate vessels. For example, in an embodiment the controller may be directed to separate and recover hydrocarbons having boiling points from 300 to 350° C. In this embodiment, the flow through the various bypass valves may be adjusted so that the process stream is discharged from the first recuperator 806a at a temperature of 350° C. (as opposed to 850° C. as mentioned above) and discharged from the second recuperator 806b at a temperature of 300° C. This may be achieved by bypassing a portion of the return stream around the second recuperator 806b so that a relatively larger and cooler return stream is driven through the first recuperator 806a, increasing the relative amount of cooling performed by the first stage. In this way, reaction products with boiling points above 350° C. are collected in the condensate vessel 811 between the first recuperator 806a and the second recuperator 806b while reaction products having boiling points from 300 to 350° C. are collected in the condensate vessel 811 following the second recuperator 806b.

As can be seen by the above example, through the use of the controller 830 and flexibility achieved by the system's design, the operating configuration of the system 800 may be changed in real time to achieve different goals. In addition, by basing the control of the system 800 on real-time knowledge reported by the sensors and monitoring devices, the system 800 can adjust over time in response to changing conditions such as changing feedstock quality. In this aspect, through the controller 830 and the multiple stages of recuperators and condensation vessels, the system 800 may be easily configured to separate and collect different fractions of hydrocarbons into different condensation vessels. By providing more stages, even more differentiation may be provided as required. Because the controller 830 can easily reconfigure the bypass valves 812, the system 800 is uniquely capable of handling different output requirements or changes in feedstock characteristics.

In addition, the controller 830 may also be used to control and optimize the reaction products that are obtained from the pyrolysis reaction. For example, in an embodiment the controller 830 may directly or indirectly control the temperature and/or the pressure in the reaction chamber 802 to change the relative amounts of different reaction products. In an embodiment, changes in temperature or pressure in the reaction chamber may be done in real-time based on monitoring information received from the sensors and monitoring devices. For example, monitoring data indicative of the type and amount of different reaction products in the $sCO_2$ leaving the reaction chamber 802 may be provided to the controller 830. In response to preset goals, such as to optimize a subset of reaction products (e.g., maximize production of reaction products having boiling points from 250 to 350° C.), the controller 830 may then iteratively change the temperature and/or pressure in the reaction chamber until an optimized profile of reaction products is obtained based on the current goals of the system 800.

The aforementioned methods and systems for the pretreatment of coal are broadly applicable, not only to any types of coal, but also to any type carbonaceous material. Carbonaceous materials include fossil fuels such as peat, coal, gilsonite, oil shale, oil sands, tar sands, and other natural deposits of bituminous material including very low grade materials combined with substantial amounts of inert materials. Thus, for any of the methods and systems described above in the context of coal, the term "coal" may properly be replaced by carbonaceous material.

Additionally, although the aforementioned methods and systems were described in the context of supercritical carbon dioxide, other non-aqueous supercritical fluids may be used to achieve similar results. Such supercritical fluids include nitrogen, argon, methane, nitrous oxide, methanol, ethanol, propanol, cyclohexane, tetralin (1,2,3,4-tetrahydronaphthalene), and decalin (decahydronaphthalene), and acetone.

The following numbered clauses define further example aspects and features of the present technique:

1. A method for treatment of coal comprising:
pulverizing the coal into a coal dust;
pelletizing the coal dust into a coal pellet;
pretreating the coal pellet, the pretreating including holding the coal pellet in a first supercritical carbon dioxide ($sCO_2$) environment at a first temperature and a first pressure for a first period of time, thereby generating a treated pellet product; and
removing the treated pellet product from the first $sCO_2$ environment.

2. The method of clause 1 comprising:
storing the treated pellet product in an outdoor environment.

3. The method of clause 1 comprising:
transporting the treated pellet product in a manner that exposes it to an outdoor environment.

4. The method of clause 1 comprising:
gasifying the treated pellet product.

5. The method of clause 1 comprising:
burning the treated pellet product.

6. The method of clause 1, wherein the coal is selected from bituminous coal, sub-bituminous coal, lignite, and anthracite.

7. The method of clauses 1-6, wherein the first temperature is from the critical temperature of carbon dioxide up to the boiling point of water at the first pressure, the first pressure is from the critical pressure of carbon dioxide up to 30 MPa, and the first period of time is from 1 minute to 48 hours, and the treated pellet product generated by the pretreating is a dried coal pellet.

8. The method of clauses 1-6, wherein the first temperature is from the boiling point of water at the first pressure up to 650° C., the first pressure is from 7.39-30 MPa, and the first period of time is from 1 second to 48 hours, and the treated pellet product generated by the pretreating is a char pellet.

9. The method of clauses 1-6, wherein the pretreating operation comprises:
creating a dried coal pellet by holding the coal pellet in a first supercritical carbon dioxide ($sCO_2$) environment at a first temperature and a first pressure for a first period of time; and converting the dried coal pellet into the treated pellet product by holding the dried coal pellet in a second supercritical carbon dioxide ($sCO_2$) environment defined by a second temperature and a second pressure for a second period of time;

wherein the first temperature is from the critical temperature of carbon dioxide up to the boiling point of water at the first pressure, the first pressure is from the critical pressure of carbon dioxide up to 30 MPa, and the first period of time is from 1 minute to 48 hours; and wherein the second temperature is from the boiling point of water at the second pressure up to 650° C., the second pressure is from 7.39-30 MPa, and the second period of time is from 1 second to 48 hours, and the treated pellet product generated is a char pellet.

10. The method of clauses 1-9 further comprising:
recovering at least some pyrolysis reaction products from $sCO_2$ used to create the first $sCO_2$ environment.

11. The method of clauses 1-10, wherein the first period of time is predetermined.

12. The method of clauses 1-11, wherein the first period of time is determined based on a target moisture content of the treated pellet product.

13. The method of clauses 1-12, wherein pretreating includes directly or indirectly monitoring the moisture content of the coal pellet during the pretreating operation.

14. The method of clauses 1-13 wherein the pretreating includes holding the coal pellet in a reactor.

15. The method of clause 14, wherein the pretreating includes circulating $sCO_2$ through the reactor.

16. The method of clauses 1-15 wherein pelletizing includes adding water to the coal dust based on moisture content of the coal dust and a target moisture content of the coal pellet so that the coal pellet output by the pelletizing operation has a moisture content within a target range of 10-35% by weight.

17. The method of clauses 1-16, wherein the second period of time is predetermined.

18. The method of clauses 1-17, wherein the second period of time is determined based on a target moisture content of the treated pellet product.

19. The method of clauses 1-18, wherein pelletizing includes adding water to the coal dust based on moisture content of the coal dust and a target moisture content of the coal pellet so that the coal dust fed to the pelletizing operation has a moisture content within a target range of 30-50% by weight.

20. The method of clauses 9-19, wherein the creating operation and converting operation are performed in different reactors.

21. A method for treatment of carbonaceous feedstock comprising:
pulverizing the carbonaceous feedstock into a dust;
pelletizing the dust into a carbonaceous feedstock pellet;
pretreating the pellet, the pretreating including holding the carbonaceous feedstock pellet in a first supercritical carbon dioxide ($sCO_2$) environment at a first temperature and a first pressure for a first period of time, thereby generating a treated pellet product; and
removing the treated pellet product from the first $sCO_2$ environment.

22. The method of clause 21 comprising:
storing the treated pellet product in an outdoor environment.

23. The method of clause 21 comprising:
transporting the treated pellet product in a manner that exposes it to an outdoor environment.

24. The method of clause 21 comprising:
gasifying the treated pellet product.

25. The method of clause 21 comprising:
burning the treated pellet product.

26. The method of clause 21, wherein the carbonaceous feedstock includes one or more of peat, coal, gilsonite, oil shale, oil sands, tar sands, or a natural deposit containing at least some bituminous material.

27. The method of clauses 21-26, wherein the first temperature is from the critical temperature of carbon dioxide up to the boiling point of water at the first pressure, the first pressure is from the critical pressure of carbon dioxide up to 30 MPa, and the first period of time is from 1 minute to 48 hours, and the treated pellet product generated by the pretreating is a dried pellet.

28. The method of clauses 21-26, wherein the first temperature is from the boiling point of water at the first pressure up to 650° C., the first pressure is from 7.39-30 MPa, and the first period of time is from 1 second to 48 hours.

29. The method of clauses 21-26, wherein the pretreating operation comprises:
creating a dried pellet by holding the carbonaceous feedstock pellet in a first supercritical carbon dioxide ($sCO_2$) environment at a first temperature and a first pressure for a first period of time; and
converting the dried pellet into the treated pellet product by holding the dried pellet in a second supercritical carbon dioxide ($sCO_2$) environment defined by a second temperature and a second pressure for a second period of time;

wherein the first temperature is from the critical temperature of carbon dioxide up to the boiling point of water at the first pressure, the first pressure is from the critical pressure of carbon dioxide up to 30 MPa, and the first period of time is from 1 minute to 48 hours; and wherein the second temperature is from the boiling point of water at the second pressure up to 650° C., the second pressure is from 7.39-30 MPa, and the second period of time is from 1 second to 48 hours.

30. The method of clauses 21-29 further comprising:
recovering at least some pyrolysis reaction products from $sCO_2$ used to create the first $sCO_2$ environment.

31. The method of clauses 21-30, wherein the first period of time is predetermined.

32. The method of clauses 21-31, wherein the first period of time is determined based on a target moisture content of the treated pellet product.

33. The method of clauses 21-32, wherein pretreating includes directly or indirectly monitoring the moisture content of the coal pellet during the pretreating operation.

34. The method of clauses 21-33 wherein the pretreating includes holding the coal pellet in a reactor.

35. The method of clause 34, wherein the pretreating includes circulating $sCO_2$ through the reactor.

36. The method of clauses 21-35 wherein pelletizing includes adding water to the coal dust based on moisture content of the dust and a target moisture content of the carbonaceous feedstock pellet so that the coal pellet output by the pelletizing operation has a moisture content within a target range of 10-35% by weight.

37. The method of clauses 21-36, wherein the second period of time is predetermined.

38. The method of clauses 21-37, wherein the second period of time is determined based on a target moisture content of the treated pellet product.

39. The method of clauses 21-38 wherein pelletizing includes adding water to the dust based on moisture content of the dust and a target moisture content of the carbonaceous feedstock pellet so that the dust fed to the pelletizing operation has a moisture content within a target range of 30-50% by weight.

40. The method of clauses 9-39, wherein the creating operation and converting operation are performed in the same reactor.

41. A method for treatment of lignite comprising:
pulverizing the lignite into a coal dust;
pelletizing the coal dust into a coal pellet;
pretreating the coal pellet, the pretreating including holding the coal pellet in a first supercritical carbon dioxide (sCO$_2$) environment at a first temperature and a first pressure for a first period of time, thereby generating a treated pellet product; and
removing the treated pellet product from the first sCO$_2$ environment.

42. The method of clause 41 comprising:
storing the treated pellet product in an outdoor environment.

43. The method of clause 41 comprising:
transporting the treated pellet product in a manner that exposes it to an outdoor environment.

44. The method of clause 41 comprising:
gasifying the treated pellet product.

45. The method of clause 41 comprising:
burning the treated pellet product.

46. The method of clause 41, wherein the lignite was formed from naturally compressed peat.

47. The method of clauses 41-46, wherein the first temperature is from the critical temperature of carbon dioxide up to the boiling point of water at the first pressure, the first pressure is from the critical pressure of carbon dioxide up to 30 MPa, and the first period of time is from 1 minute to 48 hours, and the treated pellet product generated by the pretreating is a dried coal pellet.

48. The method of clauses 41-46, wherein the first temperature is from the boiling point of water at the first pressure up to 650° C., the first pressure is from 7.39-30 MPa, and the first period of time is from 1 second to 48 hours, and the treated pellet product generated by the pretreating is a char pellet.

49. The method of clauses 41-46, wherein the pretreating operation comprises:
creating a dried coal pellet by holding the coal pellet in a first supercritical carbon dioxide (sCO$_2$) environment at a first temperature and a first pressure for a first period of time; and
converting the dried coal pellet into the treated pellet product by holding the dried coal pellet in a second supercritical carbon dioxide (sCO$_2$) environment defined by a second temperature and a second pressure for a second period of time;
wherein the first temperature is from the critical temperature of carbon dioxide up to the boiling point of water at the first pressure, the first pressure is from the critical pressure of carbon dioxide up to 30 MPa, and the first period of time is from 1 minute to 48 hours; and
wherein the second temperature is from the boiling point of water at the second pressure up to 650° C., the second pressure is from 7.39-30 MPa, and the second period of time is from 1 second to 48 hours, and the treated pellet product generated is a char pellet.

50. The method of clauses 41-49 further comprising:
recovering at least some pyrolysis reaction products from sCO$_2$ used to create the first sCO$_2$ environment.

51. The method of clauses 41-50, wherein the first period of time is predetermined.

52. The method of clauses 41-51, wherein the first period of time is determined based on a target moisture content of the treated pellet product.

53. The method of clauses 41-52, wherein pretreating includes directly or indirectly monitoring the moisture content of the coal pellet during the pretreating operation.

54. The method of clauses 41-53 wherein the pretreating includes holding the coal pellet in a reactor.

55. The method of clause 54, wherein the pretreating includes circulating sCO$_2$ through the reactor.

56. The method of clauses 41-55 wherein pelletizing includes adding water to the coal dust based on moisture content of the coal dust and a target moisture content of the coal pellet so that the coal pellet output by the pelletizing operation has a moisture content within a target range of 10-35% by weight.

57. The method of clauses 41-56, wherein the second period of time is predetermined.

58. The method of clauses 41-57, wherein the second period of time is determined based on a target moisture content of the treated pellet product.

59. The method of clauses 41-58, wherein pelletizing includes adding water to the coal dust based on moisture content of the coal dust and a target moisture content of the coal pellet so that the coal dust fed to the pelletizing operation has a moisture content within a target range of 30-50% by weight.

60. The method of clauses 49-59, wherein the creating operation and converting operation are performed in different reactors.

61. A method for treatment of coal comprising:
pulverizing the coal into a coal dust;
pelletizing the coal dust into a coal pellet;
pretreating the coal pellet, the pretreating including holding the coal pellet in a first supercritical fluid (SF) environment at a first temperature and a first pressure for a first period of time, thereby generating a treated pellet product; and
removing the treated pellet product from the first SF environment.

62. The method of clause 61 comprising:
storing the treated pellet product in an outdoor environment.

63. The method of clause 61 comprising:
transporting the treated pellet product in a manner that exposes it to an outdoor environment.

64. The method of clause 61, wherein the SF is selected from carbon dioxide, nitrogen, argon, methane, nitrous oxide, methanol, ethanol, propanol, cyclohexane, tetralin, decalin, acetone, or any combination of the aforementioned.

65. The method of clause 61 comprising:
burning the treated pellet product.

66. The method of clause 61, wherein the coal is selected from bituminous coal, sub-bituminous coal, lignite, and anthracite.

67. The method of clauses 61-66, wherein the first temperature is from the critical temperature of the SF up to the boiling point of water at the first pressure, the first pressure is from the critical pressure of the SF up to 30 MPa, and the first period of time is from 1 minute to 48 hours, and the treated pellet product generated by the pretreating is a dried coal pellet.

68. The method of clauses 61-66, wherein the first temperature is from the boiling point of water at the first pressure up to 650° C., the first pressure is from 7.39-30

MPa, and the first period of time is from 1 second to 48 hours, and the treated pellet product generated by the pretreating is a char pellet.

69. The method of clauses 61-66, wherein the pretreating operation comprises:

creating a dried coal pellet by holding the coal pellet in a first SF environment at a first temperature and a first pressure for a first period of time; and converting the dried coal pellet into the treated pellet product by holding the dried coal pellet in a second SF environment defined by a second temperature and a second pressure for a second period of time;

wherein the first temperature is from the critical temperature of the SF up to the boiling point of water at the first pressure, the first pressure is from the critical pressure of the SF up to 30 MPa, and the first period of time is from 1 minute to 48 hours; and wherein the second temperature is from the boiling point of water at the second pressure up to 650° C., the second pressure is from 7.39-30 MPa, and the second period of time is from 1 second to 48 hours, and the treated pellet product generated is a char pellet.

70. The method of clauses 61-69 further comprising: recovering at least some pyrolysis reaction products from SF used to create the first SF environment.

71. The method of clauses 61-70, wherein the first period of time is predetermined.

72. The method of clauses 61-71, wherein the first period of time is determined based on a target moisture content of the treated pellet product.

73. The method of clauses 61-72, wherein pretreating includes directly or indirectly monitoring the moisture content of the coal pellet during the pretreating operation.

74. The method of clauses 61-73 wherein the pretreating includes holding the coal pellet in a reactor.

75. The method of clause 74, wherein the pretreating includes circulating SF through the reactor.

76. The method of clauses 61-75 wherein pelletizing includes adding water to the coal dust based on moisture content of the coal dust and a target moisture content of the coal pellet so that the coal pellet output by the pelletizing operation has a moisture content within a target range of 10-35% by weight.

77. The method of clauses 61-76, wherein the second period of time is predetermined.

78. The method of clauses 61-77, wherein the second period of time is determined based on a target moisture content of the treated pellet product.

79. The method of clauses 61-78, wherein pelletizing includes adding water to the coal dust based on moisture content of the coal dust and a target moisture content of the coal pellet so that the coal dust fed to the pelletizing operation has a moisture content within a target range of 30-50% by weight.

80. The method of clauses 69-79, wherein the creating operation and converting operation are performed in different reactors.

81. A method for treatment of carbonaceous feedstock comprising:

pulverizing the carbonaceous feedstock into a dust;

pelletizing the dust into a carbonaceous feedstock pellet;

pretreating the pellet, the pretreating including holding the carbonaceous feedstock pellet in a first supercritical fluid (SF) environment at a first temperature and a first pressure for a first period of time, thereby generating a treated pellet product; and removing the treated pellet product from the first SF environment.

82. The method of clause 81 comprising:
storing the treated pellet product in an outdoor environment.

83. The method of clause 81 comprising:
transporting the treated pellet product in a manner that exposes it to an outdoor environment.

84. The method of clause 81 comprising:
gasifying the treated pellet product.

85. The method of clause 81 comprising:
burning the treated pellet product.

86. The method of clause 81, wherein the carbonaceous feedstock includes one or more of peat, coal, gilsonite, oil shale, oil sands, tar sands, or a natural deposit containing at least some bituminous material.

87. The method of clauses 81-86, wherein the first temperature is from the critical temperature of the SF up to the boiling point of water at the first pressure, the first pressure is from the critical pressure of the SF up to 30 MPa, and the first period of time is from 1 minute to 48 hours, and the treated pellet product generated by the pretreating is a dried pellet.

88. The method of clauses 81-86, wherein the first temperature is from the boiling point of water at the first pressure up to 650° C., the first pressure is from 7.39-30 MPa, and the first period of time is from 1 second to 48 hours.

89. The method of clauses 81-86, wherein the pretreating operation comprises:

creating a dried pellet by holding the carbonaceous feedstock pellet in the first SF environment at a first temperature and a first pressure for a first period of time; and converting the dried pellet into the treated pellet product by holding the dried pellet in a second SF environment defined by a second temperature and a second pressure for a second period of time;

wherein the first temperature is from the critical temperature of the SF up to the boiling point of water at the first pressure, the first pressure is from the critical pressure of the SF up to 30 MPa, and the first period of time is from 1 minute to 48 hours; and wherein the second temperature is from the boiling point of water at the second pressure up to 650° C., the second pressure is from the critical pressure of the SF to 30 MPa, and the second period of time is from 1 second to 48 hours.

90. The method of clauses 81-89 further comprising:
recovering at least some pyrolysis reaction products from SF used to create the first SF environment.

91. The method of clauses 81-90, wherein the first period of time is predetermined.

92. The method of clauses 81-91, wherein the first period of time is determined based on a target moisture content of the treated pellet product.

93. The method of clauses 81-92, wherein pretreating includes directly or indirectly monitoring the moisture content of the coal pellet during the pretreating operation.

94. The method of clauses 81-93 wherein the pretreating includes holding the coal pellet in a reactor.

95. The method of clause 94, wherein the pretreating includes circulating $sCO_2$ through the reactor.

96. The method of clauses 81-95 wherein pelletizing includes adding water to the coal dust based on moisture content of the dust and a target moisture content of the carbonaceous feedstock pellet so that the coal pellet output by the pelletizing operation has a moisture content within a target range of 10-35% by weight.

97. The method of clauses 81-96, wherein the second period of time is predetermined.

98. The method of clauses 81-97, wherein the second period of time is determined based on a target moisture content of the treated pellet product.

99. The method of clauses 81-98 wherein pelletizing includes adding water to the dust based on moisture content of the dust and a target moisture content of the carbonaceous feedstock pellet so that the dust fed to the pelletizing operation has a moisture content within a target range of 30-50% by weight.

100. The method of clauses 9-99, wherein the creating operation and converting operation are performed in the same reactor.

101. The method of clause 81, wherein the SF is selected from carbon dioxide, nitrogen, argon, methane, nitrous oxide, methanol, ethanol, propanol, cyclohexane, tetralin, decalin, acetone, or any combination of the aforementioned.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contains certain errors necessarily resulting from the standard deviations found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A method for treatment of coal comprising:
pulverizing the coal into a coal dust;
pelletizing the coal dust into a coal pellet;
treating the coal pellet, the treating including holding the coal pellet in a first supercritical carbon dioxide ($sCO_2$) environment, thereby generating a treated pellet product and pyrolysis reaction products; and
removing the treated pellet product from the first $sCO_2$ environment.

2. The method of claim 1 comprising:
storing the treated pellet product in an outdoor environment.

3. The method of claim 1 comprising:
transporting the treated pellet product in a manner that exposes it to an outdoor environment.

4. The method of claim 1 comprising:
gasifying the treated pellet product.

5. The method of claim 1 comprising:
burning the treated pellet product.

6. The method of claim 1, wherein the coal is selected from bituminous coal, sub-bituminous coal, lignite, and anthracite.

7. The method of claim 1, wherein the first temperature is from a critical temperature of carbon dioxide up to a boiling point of water at the first pressure, the first pressure is from a critical pressure of carbon dioxide up to 30 MPa, and the first period of time is from 1 minute to 48 hours, and the treated pellet product generated by the treating is a dried coal pellet.

8. The method of claim 1, wherein the first temperature is from a boiling point of water at the first pressure up to 650° C., the first pressure is from 7.39-30 MPa, and the first period of time is from 1 second to 48 hours, and the treated pellet product generated by the treating is a char pellet.

9. The method of claim 1, wherein treating further comprises:
creating a dried coal pellet by holding the coal pellet in the first $sCO_2$ environment at a first temperature and a first pressure for a first period of time; and
converting the dried coal pellet into the treated pellet product by holding the dried coal pellet in a second $sCO_2$ environment defined by a second temperature and a second pressure for a second period of time;
wherein the first temperature is from the critical temperature of carbon dioxide up to the boiling point of water at the first pressure, the first pressure is from the critical pressure of carbon dioxide up to 30 MPa, and the first period of time is from 1 minute to 48 hours; and
wherein the second temperature is from the boiling point of water at the second pressure up to 650° C., the second pressure is from 7.39-30 MPa, and the second period of time is from 1 second to 48 hours, and the treated pellet product generated is a char pellet.

10. The method of claim 1, wherein at least some pyrolysis reaction products are created while holding the coal pellet in the first supercritical carbon dioxide ($sCO_2$) environment at the first temperature and the first pressure for the first period of time, and treating the coal pellet further comprises:
recovering at least some pyrolysis reaction products from $sCO_2$ used to create the first $sCO_2$ environment.

11. The method of claim 1, wherein the first period of time is predetermined.

12. The method of claim 1, wherein the first period of time is determined to achieve a predetermined moisture content of the treated pellet product.

13. The method of claim 1 wherein the treating includes holding the coal pellet in a reactor.

14. The method of claim 13, wherein the treating includes circulating $sCO_2$ through the reactor.

15. The method of claim 1 wherein pelletizing includes adding water to the coal dust based on the moisture content of the coal dust and a target moisture content of the coal pellet so that the coal pellet output by the pelletizing has a moisture content within a target range of 10-35% by weight.

16. The method of claim 1, wherein the second period of time is predetermined.

17. The method of claim 1, wherein the second period of time is determined to achieve a predetermined moisture content of the treated pellet product.

18. The method of claim 1, wherein pelletizing includes adding water to the coal dust based on moisture content of the coal dust and a target moisture content of the coal pellet so that the coal dust fed to the pelletizing has a moisture content within a target range of 30-50% by weight.

19. The method of claim 9, wherein the creating and the converting are performed in different reactors.

20. A method for treatment of carbonaceous feedstock comprising:
- pulverizing the carbonaceous feedstock into a dust;
- pelletizing the dust into a carbonaceous feedstock pellet;
- treating the pellet, the treating including holding the carbonaceous feedstock pellet in a first supercritical carbon dioxide ($sCO_2$) environment, thereby generating a treated pellet product; and
- removing the treated pellet product from the first $sCO_2$ environment.

21. A method for treatment of carbonaceous feedstock comprising:
- pulverizing the carbonaceous feedstock into a dust;
- pelletizing the dust into a carbonaceous feedstock pellet;
- treating the pellet, the treating including holding the carbonaceous feedstock pellet in a first supercritical fluid (SF) environment, thereby generating a treated pellet product; and
- removing the treated pellet product from the first SF environment.

\* \* \* \* \*